(12) United States Patent
Asano et al.

(10) Patent No.: US 11,288,500 B2
(45) Date of Patent: Mar. 29, 2022

(54) SCAN APPARATUS AND SCAN RESULT DISPLAY PROGRAM

(71) Applicant: SEIKO EPSON CORPORATION, Tokyo (JP)

(72) Inventors: Tetsuya Asano, Nagano (JP); Kentaro Kanada, Nagano (JP); Kenichiro Amemiya, Nagano (JP); Nao Sato, Nagano (JP); Yuichi Kitazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 16/299,228

(22) Filed: Mar. 12, 2019

(65) Prior Publication Data

US 2019/0286897 A1    Sep. 19, 2019

(30) Foreign Application Priority Data

Mar. 14, 2018    (JP) .............................. JP2018-046359

(51) Int. Cl.
*G06K 9/00* (2006.01)
*G06K 9/34* (2006.01)
*H04N 1/00* (2006.01)
*G06Q 40/00* (2012.01)

(52) U.S. Cl.
CPC ..... *G06K 9/00469* (2013.01); *G06K 9/00449* (2013.01); *G06K 9/00456* (2013.01); *G06K 9/00463* (2013.01); *G06K 9/344* (2013.01); *G06Q 40/12* (2013.12); *H04N 1/00331* (2013.01); *G06K 2209/01* (2013.01)

(58) Field of Classification Search
CPC ....................... G06K 9/00536; G06K 9/00489
See application file for complete search history.

(56) References Cited

U.S. PATENT DOCUMENTS 9,922,375 B1 *   3/2018   Neveu .................... G06Q 40/12
2004/0083134 A1   4/2004   Spero et al.
(Continued)

FOREIGN PATENT DOCUMENTS

JP        08-161436 A    6/1996
JP      2010-055322 A    3/2010
(Continued)

OTHER PUBLICATIONS

Abbyy Finereader: "ABBYY FineReader 14 User's Guide"; Jan. 1, 2017; Retrieved from the Internet: URL:https://www.abbyy.com/media/14009/guide_english.pdf pp. 75, 98, pp. 101, 115.
(Continued)

*Primary Examiner* — Joshua L Schwartz
(74) *Attorney, Agent, or Firm* — Global IP Counselors, LLP

(57) ABSTRACT

A scan system that reads amount information from a scanned receipt and performs reporting, displays a first area in which a content read from the receipt is displayed and a second area in which an image of the scanned receipt is displayed when a scan of the receipt is completed, hides at least one of the first area and the second area displayed on a display upon receiving an operation of a user, and displays at least one of the hidden first area and second area upon receiving an operation of the user.

4 Claims, 18 Drawing Sheets

(56) References Cited

U.S. PATENT DOCUMENTS

| | | | |
|---|---|---|---|
| 2009/0178144 A1* | 7/2009 | Redlich | G06F 21/6209 |
| | | | 726/27 |
| 2013/0230205 A1 | 9/2013 | Nuggehalli | |
| 2015/0023604 A1* | 1/2015 | Mitchell | G06K 9/00483 |
| | | | 382/217 |
| 2016/0189314 A1 | 6/2016 | Nakayama | |
| 2019/0236351 A1* | 8/2019 | Mizukura | G06K 9/00671 |
| 2020/0104586 A1* | 4/2020 | Takahashi | G06K 9/00402 |

FOREIGN PATENT DOCUMENTS

| | | |
|---|---|---|
| JP | 2016-126356 A | 7/2016 |
| JP | 2017-149026 A | 8/2017 |

OTHER PUBLICATIONS

The Extended European Search Report for the corresponding European Patent Application No. 19162922.9 dated Jul. 16, 2019.
Anonymous; "image%255B6%255D.png (image)" Jun. 4, 2014; p. 1-1XP055812646, retrieved from the Internet: URL:http://ih3.ggpht.com/-Q97705vXeM4/U45OYaFjDoI/AAAAAAAAUMk/Ypms_FSCJB8/s1600-h/image%255B6%255D.png.

* cited by examiner

SCAN APPARATUS AND SCAN RESULT DISPLAY PROGRAM

BACKGROUND

1. Technical Field

The present invention relates to a scan apparatus and a scan result display program.

2. Related Art

In the related art, a technique for performing OCR (optical character recognition) processing on a reading result of a receipt is known (for example, refer to JP-A-8-161436).

As a scan apparatus that reads a receipt and performs an OCR processing, a scan apparatus that is easier to use has been in demand.

SUMMARY

According to an aspect of the invention, there is provided a scan apparatus that reads amount information by the OCR processing from a scanned receipt and performs reporting. The scan apparatus includes a processor that displays a first area in which a content read by performance of the OCR processing on a receipt is displayed on a display and a second area in which an image of the scanned receipt is displayed on the display when a san of the receipt is completed, hides at least one of the first area and the second area displayed on the display upon receiving an operation of a user on a third area displayed on the display, and displays at least one of the hidden first area and second area on the display upon receiving an operation of the user on the third area. With this configuration, the user can visually review the OCR processing result and the scan result when the scan is completed. Therefore, the user himself does not need to perform an instruction to start a review of the OCR processing result. Therefore, a scan apparatus that is easy to use can be provided. In this application, a receipt is a generic name of documents relating to payment of money or an equivalent thereof such as a sales slip, an invoice, or the like. That the display is performed when the scan of the receipt is completed means that the operation of the user is not needed in accordance with the completion of the scan of the receipt, and the display is not limited to a direct link such that the display is performed immediately when the scan is completed, but may be indirectly linked such that another processing is started in accordance with the completion of the scan and the display is performed in accordance with the completion of the another processing.

The processor may be configured to display the first area, the second area, the third area and a fourth area in which a list of receipts is displayed on the display when the scan of the receipt is completed. With this configuration, the user can visually review the list of the receipts together with the OCR processing result and the scan result. Therefore, the user can visually review the information of a plurality of scanned receipts together with the information of an individual receipt.

Further, the processor may be configured to hide the first area or the second area in accordance with the start instruction of the scan of the receipt. With this configuration, from the beginning to the completion of the scan, the screen can be simplified.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described in the following order.
1. Configuration of Scan Apparatus:
2. Scan Result Display Processing:
3. Other Embodiment:

1. Configuration of Scan Apparatus

Figure 1:
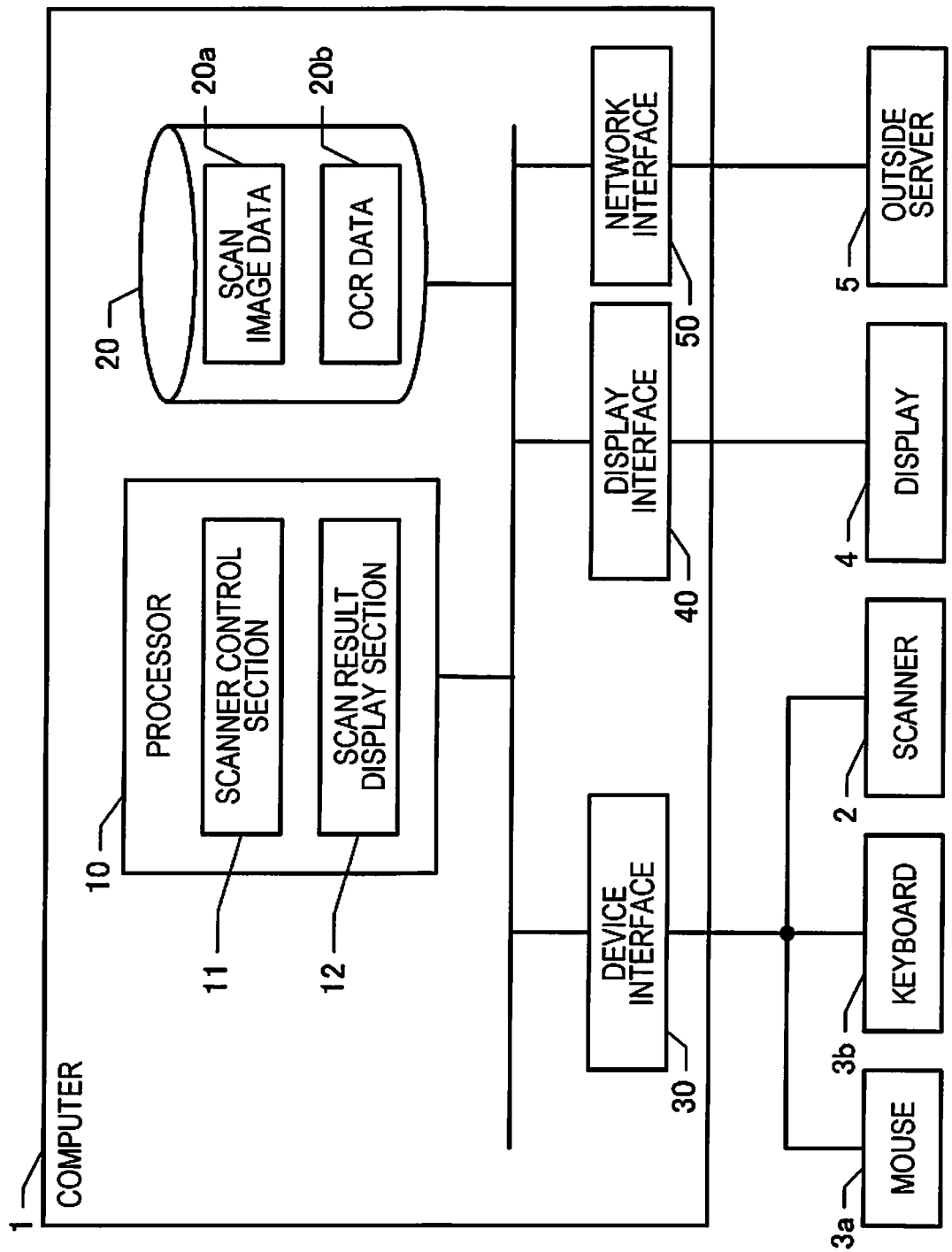
FIG. 1 is a block diagram of a scan apparatus.

FIG. 1 is a block diagram showing a scan apparatus according to an embodiment of the invention. The scan apparatus according to the embodiment includes a computer 1 and a scanner 2. The computer 1 includes a processor 10, HDD (hard disk drive) 20, a device interface 30, a display interface 40, and network interface 50.

The device interface 30 is an interface to which a device that communicates in accordance with a predetermined communication protocol (for example, USB (Universal Serial Bus) standard) can be connected. In the embodiment, the scanner 2, a mouse 3a, and a keyboard 3b are connected to the device interface 30. The scanner 2 includes a light source that irradiates a document with a light, a color image sensor that receives light from the document and obtains the read data, and a device component or the like for moving a variety of movable portions. In the embodiment, the scanner 2 can read a receipt and output a scan image. The computer 1 can acquire the scan image that the scanner 2 outputs through the device interface 30. A method of reading a document in the scanner 2 may be of a variety of aspects, including a flatbed method, a method of reading the document transported by an ADF, or both.

The mouse 3a includes an operation section and a button gripped and moved by the user and outputs the information showing the amount of movement of the operation section and the information showing a result of an operation on the button. The computer 1 can acquire the information that the mouse 3a outputs through the device interface 30 and receive an operation of the user on the basis of the information. The keyboard 3b includes a plurality of keys and outputs information indicating an operation on the keys. The computer 1 can acquire information that the keyboard 3b outputs through the device interface 30 and receive the operation of the user on the basis of the information.

The display interface 40 is an interface to which a display 4 is connected. The computer 1 can output a control signal on the display 4 through the display interface 40 and displays a variety of images to be displayed on the display 4. The scan image data 20a showing a multi-value image read by the scanner 2 can be recorded in an HDD 20.

The network interface 50 is an interface for performing communication with an outside device through the internet. In the embodiment, the processor 10 can perform communication with an outside server 5 through the network interface 50. In the embodiment, the outside server 5 collects a variety of information including the amount information written in a receipt from the user and provides a service relating to a variety of information written in the receipt to the user. That is, the outside server 5 records a variety of information including the amount information reported from the user in a recording medium (not shown) and provides the user with a variety of support services relating to statistical processing, accounting processing, tax, and the like.

The processor 10 includes a CPU, a RAM, and the like and can execute a variety of programs recorded in the HDD 20. In the embodiment, a scanner driver and a scan result display program are included in the program. The scanner driver is a program that controls the scanner 2. When the scanner driver is executed, the processor 10 functions as a scanner control section 11. The processor 10 executes a function of controlling the scanner 2, causing the scanner 2 to read a target medium (receipt) and acquiring the scan image data 20a showing the reading result by the functioning of the scanner control section 11. When the scan image data 20a is acquired, the processor 10 records the scan image data 20a in the HDD 20.

The scan result display program is a program for performing the OCR processing on the reading result of receipts for a report and displaying the result. When the scan result display program is executed, the processor 10 functions as a scan result display section 12. By the functioning of the scan result display section 12, the processor 10 executes the functions of acquiring a variety of information such as amount information and the like on the basis of the scan image acquired by the scanner 2 reading the receipt so as to display the information on the display 4 and reporting the information to the outside server 5.

Specifically, in the present embodiment, the processor 10 displays the user interface screen including a plurality of windows on the display 4. That is, the processor 10 displays an object such as an icon or the like to be displayed on the display 4 on the basis of the image data (not shown) prepared in advance. Also, the text written in the receipt is displayed on the display 4 on the basis of the text data showing the OCR processing result of the display target receipt. The user can perform management relating to the report of the information read from the receipt through the user interface screen. In the embodiment, the number of windows displayed as a user interface screen changes during the scan.

Figure 2:
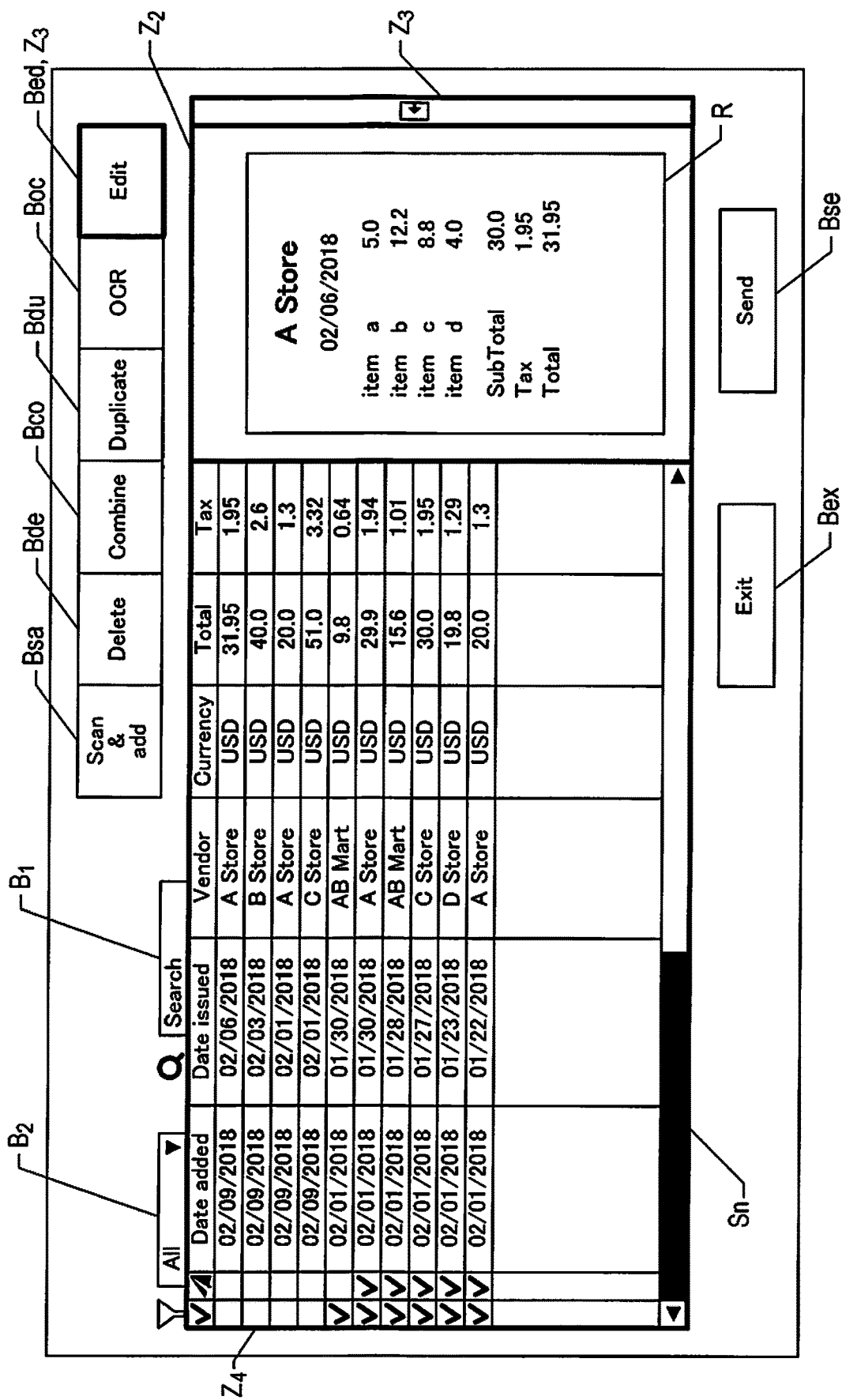
FIG. 2 is a view showing an example of an interface screen.

FIG. 2 is a view showing an example of a user interface screen. The second area $Z_2$ in which the scan image of the receipt is displayed, the third area $Z_3$ in which an operation button for instructing whether to display or hide the edit screen of the OCR processing result is displayed, and the fourth area $Z_4$ in which a list of the receipts is displayed are included in the user interface screen. In FIG. 2, the second area $Z_2$, the third area $Z_3$, and the fourth area $Z_4$ are highlighted by the frame of bold solid lines, but the thickness of the frame lines of each area may be equal to the thickness of other areas in the actual screen. Also, the third area $Z_3$ is provided in two places in the embodiment.

The second area $Z_2$ is an area in which a scan image of the receipt is displayed, and a scan image of a rectangular receipt R is displayed in the exampled shown in FIG. 2. That is, in a state where a receipt is set in the scanner 2, the processor 10 controls the scanner 2 and scans the receipt. As a result, the scan image is associated with the identification information (ID or the like) of the receipt and recorded as the scan image data 20a in the HDD 20. If the scan image data 20a is acquired, the processor 10 can refer to the scan image data 20a at any time and display the image that the scan image data 20a represents in the second area $Z_2$. An example of the receipt R is shown in FIG. 2.

In FIG. 2, the name "A Store" of a store that issued the receipt is written at an upper portion of the scanned receipt and an issuing date "Feb. 6, 2018" is written below the store name. Also, purchased items "items a to d" and the prices "5.0", "12.2", "8.8", and "4.0" are written below the issuing date. Also, here, an example in which the currency is the US dollar is presented. Subtotal "30.0", Tax "1.95", and Total "31.95" are written below the purchased items and prices.

The third area $Z_3$ is an operation button for instructing whether or not to display an edit screen of the OCR processing result. In the embodiment, when the receipt is scanned, the processor 10 executes the OCR processing on the basis of the scan image data 20a. The OCR processing may be performed in a variety of ways. For example, the processing of binarizing the scan image data 20a and the processing of extracting letters of which the characteristics coincide with the black portion most closely may be adopted. When the OCR processing is performed properly, a variety of processing relating to statistical processing, accounting processing, tax, and the like can be executed electronically so that a letter and a numeral written in the receipt can be made into scan data.

When the OCR processing is performed, the OCR processing results for a plurality of items are acquired. The processor 10 associates each item such as tax, a total, and the like written in the receipt with a text showing the content (store name, amount, and the like) of the each item and associates the text data and the numeral data of each item with the identification information of each receipt so as to record in the HDD 20 as OCR data 20b. Here, the OCR data is data including at least the information acquired by the OCR processing from the receipt. The OCR data may include information such as a user comment which is not described in the receipt.

In the embodiment, the OCR processing for a variety of processing relating to statistical processing, accounting processing, tax, and the like is performed, but a misidentification occurs in the OCR processing very infrequently. In the embodiment, the first area $Z_1$ for reviewing the result of the OCR processing can be displayed. The user, while being able to check out the occurrence of a misidentification, can perform a correction if a misidentification occurs, an input of an item not identified, an input of a comment, and the like in the first area $Z_1$. Therefore, the first area $Z_1$ can be said to be an edit screen of the OCR processing result.

The third area $Z_3$ is an operation button for instructing to display or hide the first area $Z_1$ as an edit screen of such OCR processing result. In the example shown in FIG. 2, the button Bed at the right end of a variety of operation buttons disposed at an upper portion of the interface screen is an operation button as the third area $Z_3$, and the word "Edit" is written. Also, in the example in FIG. 2, the third area $Z_3$ is also provided on the right side of the second area $Z_2$.

The fourth area $Z_4$ is an area in which a list of receipts is displayed. In the embodiment, the OCR data 20b is associated with each receipt. In the fourth area $Z_4$, a table is formed such that the information of each item that the OCR data 20b represents is arranged in a line in the latitudinal direction and the information of each receipt is arranged in a line in the longitudinal direction. That is, the processor 10 refers to the OCR data 20b, acquires the text of each item associated with each receipt and controls the display 4 so as to display the OCR result of each receipt in the fourth area $Z_4$.

In the embodiment, there are a plurality of items associated with each receipt, so that only a part thereof is displayed in the fourth area $Z_4$ in FIG. 2. The information on the items that are not displayed can be displayed by a scrollbar. That is, when an instruction to move the pointer to the movable section Sn (referred to as a knob or the like) of the scroll bar by the mouse 3a and the movable section Sn by the mouse 3a, the processor 10 changes the items to be displayed in the fourth area $Z_4$ at the same time that the movable section Sn moves.

In the example shown in FIG. 2, the items displayed in the fourth area $Z_4$ are, from the left onward, "whether the OCR result is reviewed", "whether the OCR result is reported", "scanning date: Date added", "issuing date of receipt: Date issued", "issuer of receipt: Vendor", "currency: Currency", "total: Total", and "tax: Tax". In each item, the information on a newly scanned receipt is displayed in bold letters. Therefore, the four receipts of which "date of scan" is "Feb. 9, 2018" represent the information on the receipts newly scanned.

In the example shown in FIG. 2, information relating to the receipt is arranged from top to bottom in the order of scan. Therefore, the information of the latest receipt is displayed at the top. Also, "whether the OCR result is reviewed" and "whether the OCR result is reported" with review marks displayed thereon indicate that review and report are completed, and no review mark indicates that review and report are not completed. In FIG. 2, out of the receipts other than the four latest receipts, a review mark indicating that the OCR result is reviewed is displayed for six receipts, and a review mark indicating that the OCR result is reported is displayed for five receipts. Therefore, out of the receipts other than the four latest receipts, the OCR result is reviewed for six receipts and the OCR result is reported for five receipts. Further, no review mark is displayed for the latest four receipts. Therefore, none of the four latest receipts is reviewed and reported.

In the embodiment, the user interface screen includes an object for receiving a variety of inputs or operations in addition to the second area $Z_2$, the third area $Z_3$, and the fourth area $Z_4$. For example, on the left side of the button Bed as the third area $Z_3$ labelled "Edit", operation buttons for performing an instruction to execute a variety of functions are disposed.

The Scan& add button Bsa is a button for performing an instruction to scan the receipt and take in the image data as the scan image data 20a of the receipt. That is, when the button Bsa is operated, it is possible to select a scan instruction or a take-in instruction by a drop-down menu or the like. When the scan instruction by the button Bsa is performed by the mouse 3a or the like, the processor 10 generates the scan image data 20a by controlling the scanner 2, associates the scan image data 20a with an identification number of the receipt and records the data in the HDD 20. When the take-in instruction of the image data by the button Bsa is performed by the operation of the mouse 3a, the processor 10 regards the instructed image data as scan image data 20a, associates the data with an identification number of the receipt and stores the data in the HDD 20.

The Delete button Bde is a button for performing an instruction to delete any receipt. When the delete instruction by the button Bde is performed by the operation of the mouse 3a or the like, the processor 10 deletes the scan image data 20a and the OCR data 20b of the instructed receipt from the HDD 20. The Combine button Bco is a button for performing an instruction to combine a plurality of receipt data so as to take the combined data as one receipt data. When the instruction by the button Bco is performed by the operation of the mouse 3a, the processor 10 combines the scan image data 20a and the OCR data 20b of the instructed receipt. Then, the processor 10 takes the scan image data 20a and the OCR data 20b acquired by the combination as one receipt data, associates the data with the receipt identification number, and records the data in the HDD 20. With the operation of the button Bco, it is possible to regard a plurality of receipts scanned at a different time as related receipts. For example, when the receipt for staying at a hotel for a plurality of nights is split into a plurality of receipts, the receipts can be grouped into one receipt for a series of accommodations.

More specifically, for the scan image data 20a, one image file consisting of a plurality of pages with the scan image data 20a of a plurality of instructed receipts as separate pages is generated. Then, when one image file consisting of a plurality of pages is displayed in the second area $Z_2$, a button for switching the page is additionally displayed so that user can switch the pages by operating the button so as to review each receipt. As a matter of course, this configuration is just an example, and each of the scan image data 20a of a plurality of instructed receipts may be combined vertically into one image, for example.

For each item of OCR data 20b, if a content which is the same as the content of any receipt already input in the data is input, the contents will be combined to form a content of the item. If a content different from each other is input for each item, the contents selected on the basis of the predetermined priority may be combined to form a content of the item, or the user may select the content of the item into which the contents are combined. It is preferable that a priority be given to the contents that the user reviews and modifies over the contents the user does not review and modify.

The Duplicate button Bdu is a button for performing an instruction to duplicate the data of the receipt. When the instruction by the button Bdu is performed by an operation of the mouse 3a or the like, the processor 10 copies the scan image data 20a and the OCR data 20b of the instructed receipt, associates the data with a new identification number and records the data in HDD 20. By the operation of this button Bdu, it becomes possible to use the same receipt for other purposes. For example, when one receipt includes the items to be reported separately such as items for business use and items for personal use, it becomes possible to prepare a business use receipt which includes the items for business use only, relating to which the information is input into the OCR processing result and a personal use receipt which includes the items for personal use only, relating to which the information is input into the OCR processing result, and to file reports separately.

The OCR button Boc is a button for instructing to start the OCR processing. When the instruction by the button Boc is performed by the operation of the mouse 3a, the processor 10 executes the OCR processing on the basis of the scan image data 20a of the instructed receipt. Then, the processor 10 associates the generated OCR data 20b with the scan image data 20a and records the data in the HDD.

Further, the Send button Bse for reporting the scan image and the OCR result of the receipt to the outside server 5 is provided on the lower side of the second area $Z_2$. When the instruction by the button Bse is performed by the operation of the mouse 3a or the like, the processor 10 refers to the OCR data 20b and acquires the scan image data 20a and the OCR data 20b of a receipt not associated with the information indicating that the OCR result is reported. Then, the processor 10 generates output data in a format conforming to the destination on the basis of the acquired scan image data 20a and the OCR data 20b. Thereafter, the processor 10 transmits this output data to the outside server 5 through the network interface 50.

Instead of the outside server 5, or in addition to the outside server 5, the output data may be transmitted to another program in the computer 1. By the scan result display program performing the transmission in this way, operating on outside server 5 and computer 1, the program that provides a variety of support service relating to the statistical processing, the accounting processing, tax, and the like will be able to handle the content of the receipt. As a matter of course, the scan image data 20a and the OCR data 20b of only the receipt, which is not associated with the information indicating that the OCR result is reported but of which the OCR data 20b is reviewed and corrected by the user may be acquired and transmitted. The Exit button Bex for instructing the termination of the scan result display program is provided on the lower side of the fourth area $Z_4$. When the instruction by the button Bex is performed by the operation of the mouse 3a or the like, the processor 10 terminates the scan result display program.

Figure 3:
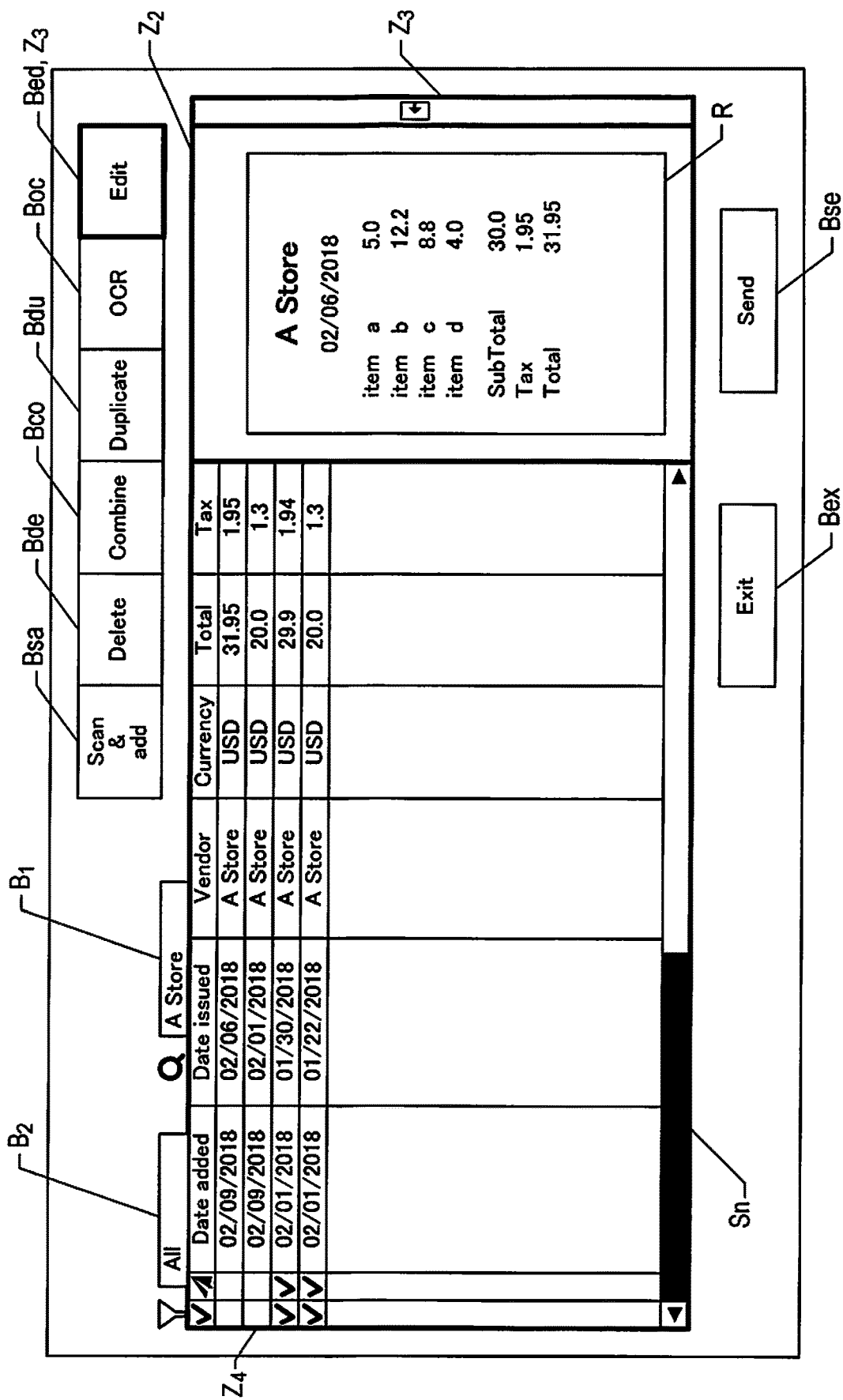
FIG. 3 is a view showing a search using the interface screen.

The box $B_1$ labelled "Search" and the box $B_2$ labelled "All" are provided on the upper side of the fourth area $Z_4$. Any text can be input in the Box $B_1$ and the search can be executed. When a text is input into the box $B_1$ by the keyboard 3b and the search is executed, the processor 10 refers to the OCR data 20b and specifies the OCR data 20b which includes the text. Then, the processor 10 displays the specified OCR data 20b of the receipt on the display 4 of the fourth area $Z_4$. FIG. 3 shows a screen in a case where "A Store" is input in the box $B_1$ and searched in the example shown in FIG. 2. That is, an example where the receipt that includes "A Store" in the OCR data 20b is displayed in the fourth area $Z_4$ is shown in FIG. 3.

Figure 4:
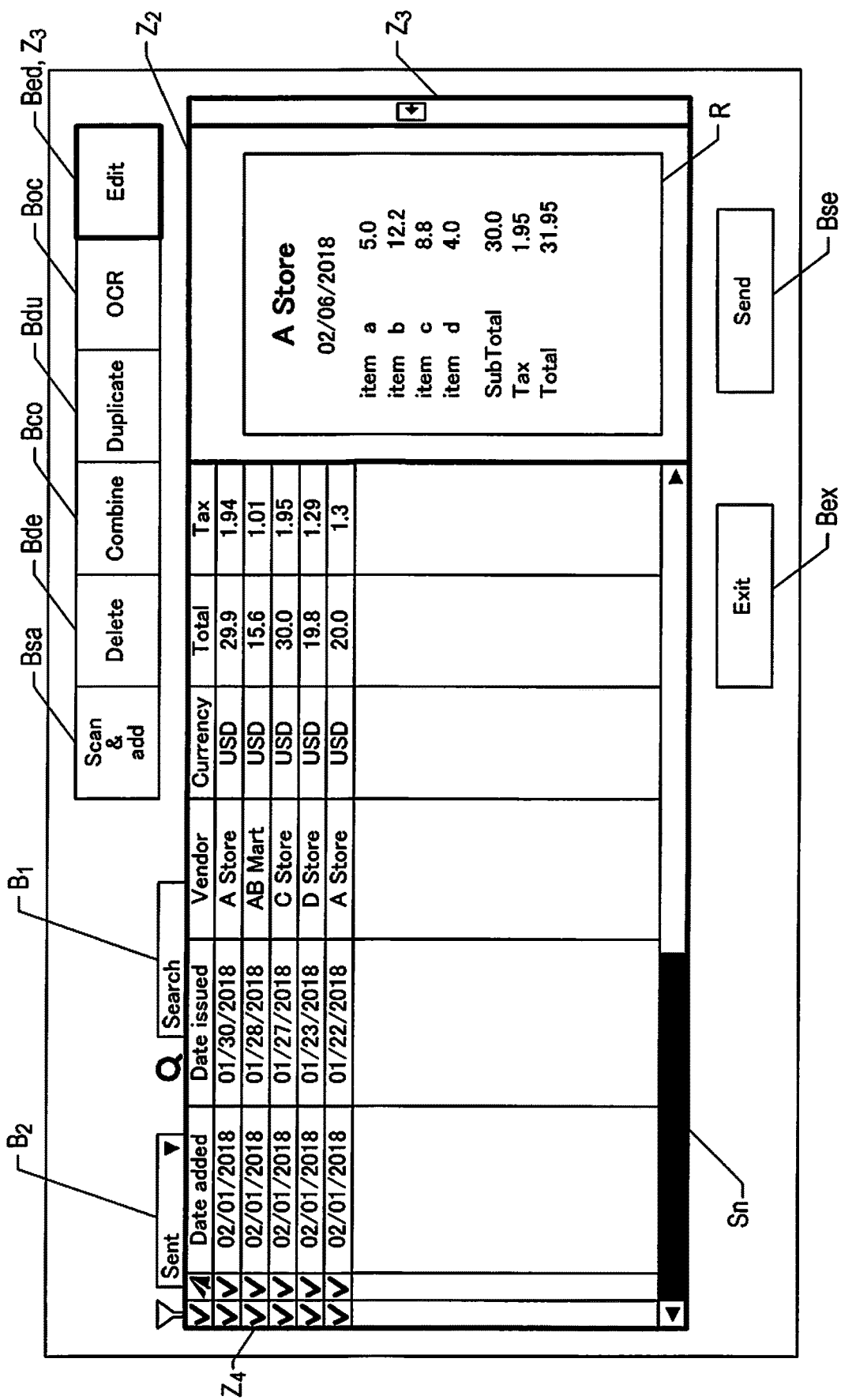
FIG. 4 is a view showing a result of specifying the receipts to be displayed by using the interface screen.

The box $B_2$ is a box for specifying the receipt to be displayed. That is, when the box $B_2$ is instructed by the operation of the mouse 3a or the like, it is possible to select any receipt out of the entire receipts, the receipt of which the OCR result is reviewed, the receipt of which the OCR result is not reviewed, or the receipt of which the OCR result is reported in the pull-down menu. The processor 10 selects the receipts to be displayed in accordance with the selection and displays the receipt information in the fourth area $Z_4$ on the basis of the OCR data 20b of the receipt to be displayed. FIG. 4 shows an example where the receipt of which the OCR result is reported (Sent) is selected by the box $B_2$ and the receipt of which the OCR result is reported is displayed in the fourth area $Z_4$ in the example shown in FIG. 2.

In the present embodiment, the user can review the OCR processing result using the interface screen as described above and transmit the reviewed receipt information (scan image and OCR processing result) to the outside server 5. Furthermore, in the present embodiment, when receipt is scanned and the OCR processing is performed, the first area $Z_1$ which is the edit screen is configured to be displayed upon the completion of the scan in order to urge the user to review.

2. Scan Result Display Processing

Figure 5:
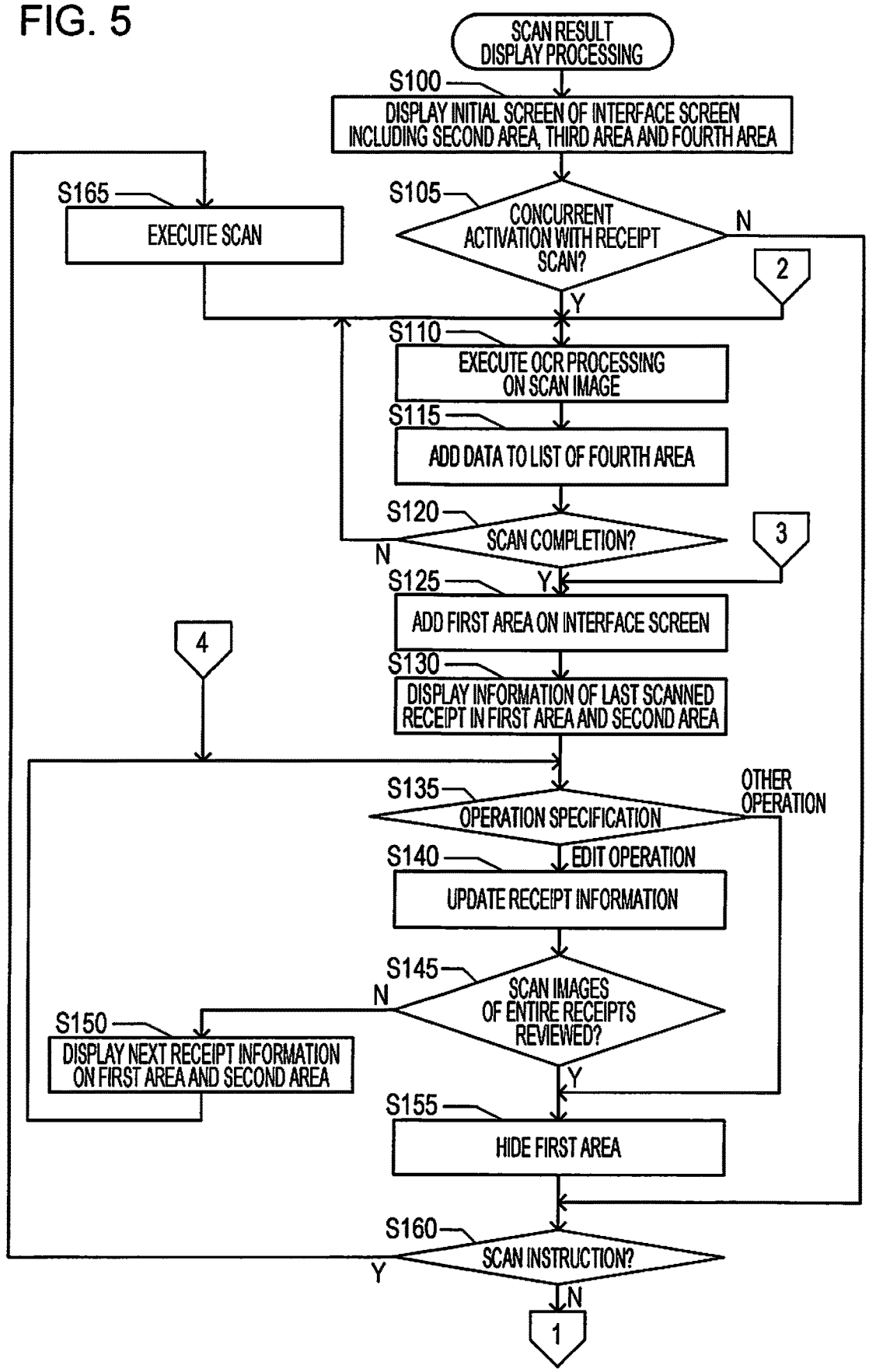
FIG. 5 is a flowchart showing scan result display processing.
Figure 6:
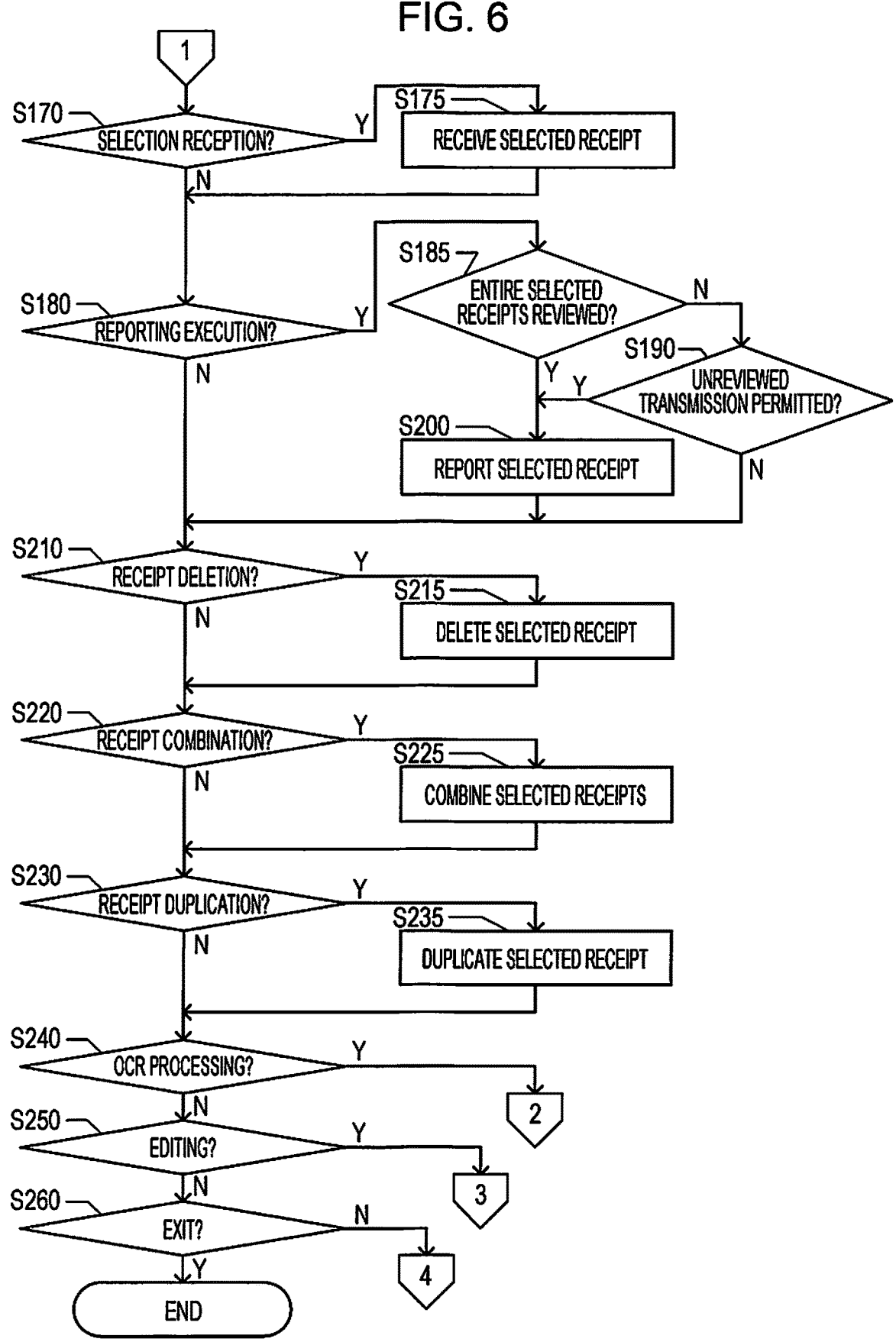
FIG. 6 is a flowchart showing scan result display processing.

The processing procedure of transition and report of the interface screen together with the flowchart of the scan result display processing shown in FIGS. 5 and 6 will be described. The scan result display processing is started in accordance with a variety of execution start triggers. The execution start trigger may be in various modes. In the present embodiment, an execution start trigger is generated by the user operating the mouse 3a or the like to instruct execution start of the scan result display program. In addition, when the user instructs the scanner 2 to start the scan of the receipt on the user interface screen or the like of the scanner driver, the execution start trigger of the scan result display program is generated.

When the execution of the scan result display processing is started by the execution start trigger, the processor 10 displays the initial screen of the interface screen which includes the second area 22, the third area $Z_3$, and the fourth area 24 by the functioning of the scan result display section 12 (step S100). That is, the processor 10 displays the interface screen by displaying an object such as an icon on the display 4 on the basis of the previously prepared image data (not shown).

Figure 7:
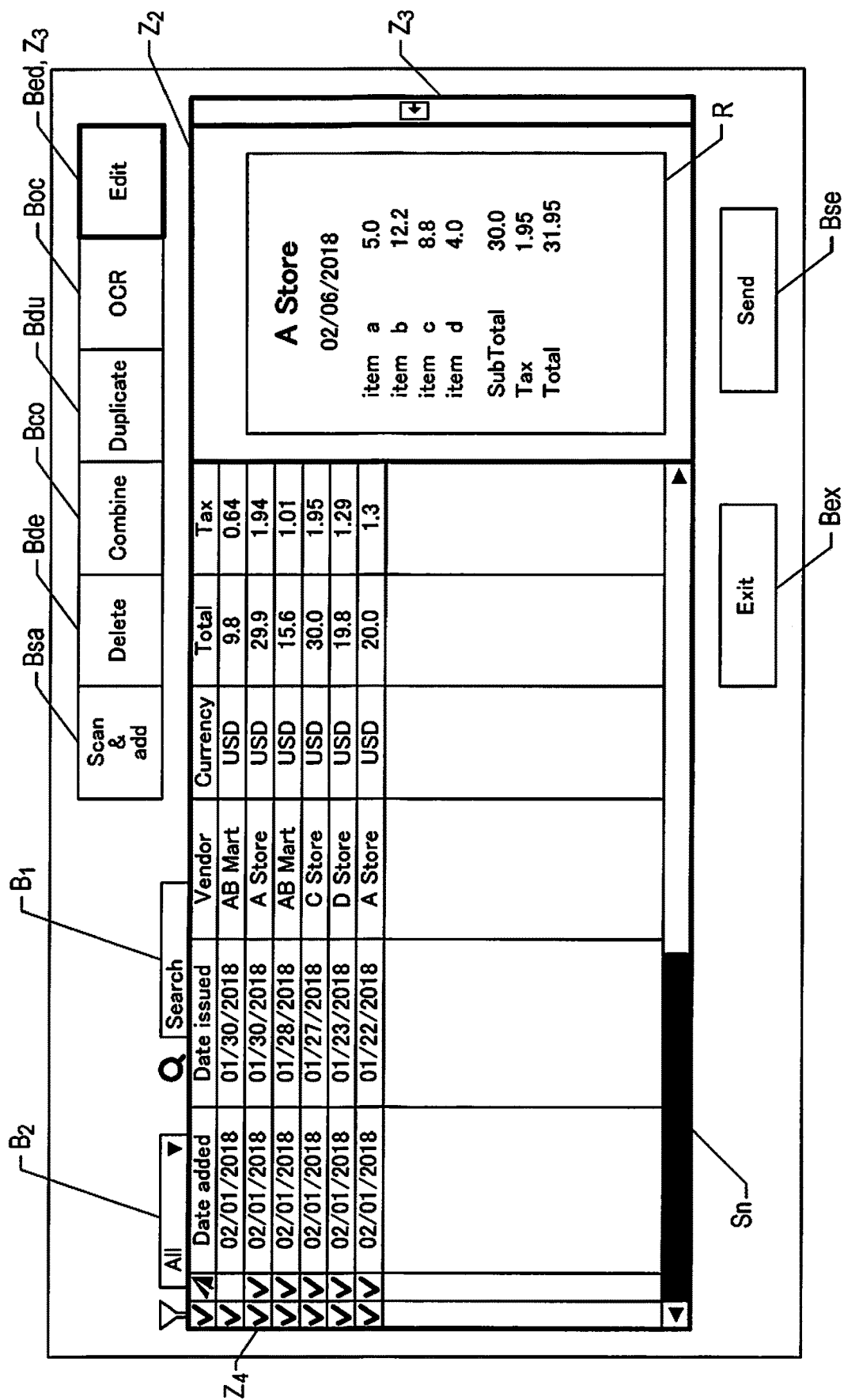
FIG. 7 is a view showing an initial screen of the interface screen displayed before the latest scan is performed.

Further, the processor 10 displays the text indicating item labels on the display 4 on the basis of the text data indicating the item labels (Date added or the like) to be displayed. Furthermore, the processor 10 refers to the OCR data 20b already recorded in the HDD 20 and displays a list by respectively associating the information read from the receipt with the item labels. FIG. 7 is a view showing an example of the initial screen of the interface prior to the performance of the latest scan as in the example shown in FIG. 2. That is, at this stage, since no new scan is performed, there is no receipt data shown in bold letters as shown in FIG. 2. In this state, the processor 10 starts receiving operations on the mouse 3a, the keyboard 3b, or the like.

Next, the processor 10 determines whether or not the scan result display program is activated together with the scan of the receipt by the functioning of the scan result display section 12 (step S105). In other words, when the scan result display processing is started as a result of the user instructing the scanner 2 to start scanning the receipt on the user interface screen or the like of the scanner driver, it is determined that the scan result display program is activated together with the scan of the receipt. When the user instructs to start the execution of the scan result display program by operating the mouse 3*a* or the like, it is not determined that the scan result display program is activated together with the scan of the receipt.

In the step S105 when it is determined that the scan result display program is activated together with the scan of the receipt, the processor 10 executes the OCR processing on a scan image by the functioning of the scan result display section 12 (step S110). That is, when it is determined that the scan result display program is activated together with the scan of the receipt, the processor 10 controls the scanner 2 so as to scan the receipt by the functioning of the scanner control section 11. As a result, the scanner 2 outputs the scan image data 20*a*, and the processor 10 associates the scan image data 20*a* with the receipt identification information and store the data in the HDD 20.

Then, the processor 10 executes the OCR processing on the basis of the scan image data 20*a* by the functioning of the scan result display section 12 and generates the OCR data 20*b*. In addition, the processor 10 associates the generated OCR data 20*b* with the original scan image data 20*a* and stores in the HDD 20.

Figure 8:
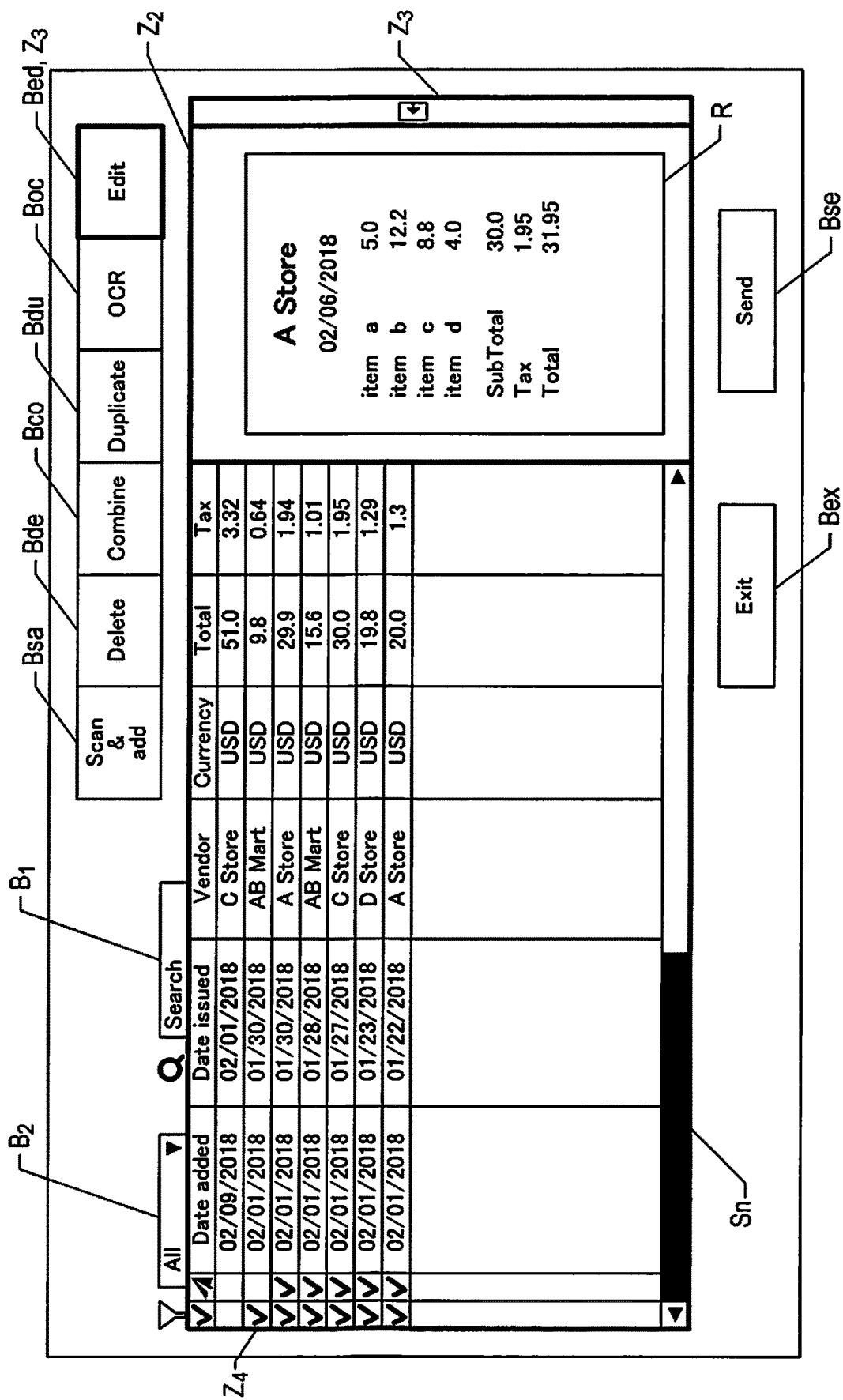
FIG. 8 is a view showing the interface screen displayed when a scan of one receipt is performed after the initial screen is displayed.

The processor 10 displays the additional data in the list of the fourth area $Z_4$ by the functioning of the scan result display section 12 (step S115). That is, the processor 10 moves the entire receipt data displayed in the fourth area $Z_4$ one step downward and displays the information indicated by the OCR data 20*b* generated in the step S110 in an empty space. At this time, the processor 10 displays the information of each item in bold letters. FIG. 8 is a view showing an example of the interface screen displayed when one receipt is scanned after the initial screen shown in FIG. 7 is displayed.

Next, the processor 10 determines whether or not the scan is completed by the functioning of the scan result display section 12 (step S120). In the present embodiment when the scan is terminated for all receipts to be scanned in accordance with a single scan start instruction and scan image data 20*a* and OCR data 20*b* are generated, it is regarded as the completion of the scan. The completion of the scan may be specified by various factors. An example includes a configuration where, in the scanner 2 provided with the ADF, when the scan is completed for the entire receipts placed in the ADF, the information indicating the termination of the scan is transmitted from the scanner 2 to the computer 1. As a matter of course, the user may instruct the completion of the scan with scanner 2, mouse 3*a*, keyboard 3*b*, or the like.

In step S120, when it is not determined that the scan is completed, the processor 10 repeats the processing from step S110 onward for the receipt of which the OCR data 20*b* is not generated at the time of scanning. On the other hand, in the step S120, when it is determined that the scan is completed, the processor 10 additionally displays the first area on the interface screen by the functioning of the scan result display section 12 (step S125). In the present embodiment, the first area $Z_1$ and the second area $Z_2$ are displayed side by side on the right and left on the user interface screen.

Therefore, the processor 10 moves the second area 22 displayed on the right side of the user interface screen on the initial screen to the left side and displays the first area $Z_1$ in the empty space. At this time, the processor 10 generates image data of animation in which the third area $Z_3$ disposed on the right side of the second area $Z_2$ on the initial screen extends to the left side, changes the screen on the right side of the display 4 on the basis of the image data. As a result, the animation in which the first area $Z_1$ is formed with the third area $Z_3$ extending to the left while the second area $Z_2$ moves to the left side is displayed on the display 4.

Next, the processor 10 displays the information of the receipt scanned last in the first area $Z_1$ and the second area $Z_2$ by the functioning of the scan result display section 12 (step S130). That is, the processor 10 displays the text indicated by OCR data 20*b* of the receipt scanned last in the first area $Z_1$ on the display 4. Also, the processor 10 displays the image indicated by the scan image data 20*a* of the receipt scanned last in the second area $Z_2$ on the display 4.

Figure 9:
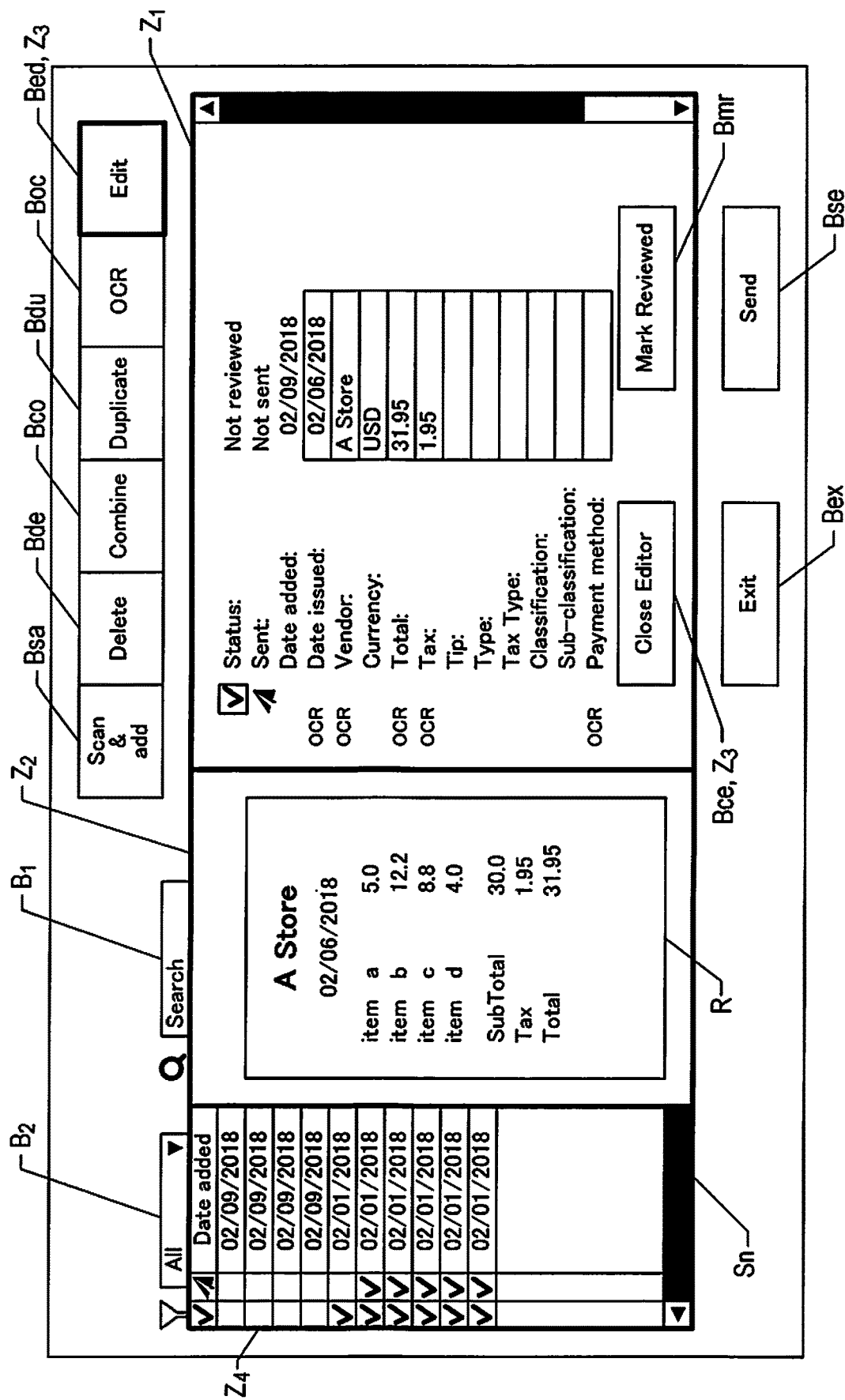
FIG. 9 is a view showing the interface screen when the scan is completed.

FIG. 9 is a view of the example in which the information of the receipt scanned last is displayed on the interface screen after the first area $Z_1$ is added on the display in the step S125. The first area $Z_1$ is an area for displaying the content read by the performance of the OCR processing on the receipt. In the example shown in FIG. 9, the information relating to the receipt is displayed for each item and the OCR processing result of the indicated receipt is displayed at the topmost portion of the fourth area $Z_4$. When the letters OCR is shown on the left side of the item labels (Date issued, or the like) in the first area $Z_1$, the item is subject to the OCR processing.

The user can edit the OCR data 20*b* in a state where the first area $Z_1$ is displayed. That is, a rectangular box is displayed side by side with the item labels of the item of which the content can be edited in the first area $Z_1$, and the user can edit the OCR data 20*b* by inputting wanted letters in the box. An item label "Sent" shows whether the OCR result is reported, and Not sent shown in FIG. 9 shows that the data of the indicated receipt is not yet reported. When the report is performed, Not sent changes into Sent. Further, a button Bmr for instructing to review the OCR result and a button Bce for instructing to close the first area $Z_1$ are disposed in the first area $Z_1$. Since the button Bce is a button for instructing to close the first area $Z_1$, the button Bce functions as the third area $Z_3$. As a matter of course, since a button Bed labelled "Edit" is the third area $Z_3$, an operation on the button Bed in the state shown in FIG. 9 is regarded as an instruction to close the first area $Z_1$.

According to the above configuration, the first area $Z_1$ is not displayed in the initial screen, but, when the scan of the receipt is completed, the configuration in which the first area $Z_1$ and the second area $Z_2$ are displayed on the display 4 is realized. According to the configuration, when the scan is completed, the user can visually review the OCR processing result and the scan result. Therefore, the user himself does not need to instruct to start the review of the OCR processing result and the scan result. Therefore, a scan apparatus that is easy to use can be provided.

Figure 10:
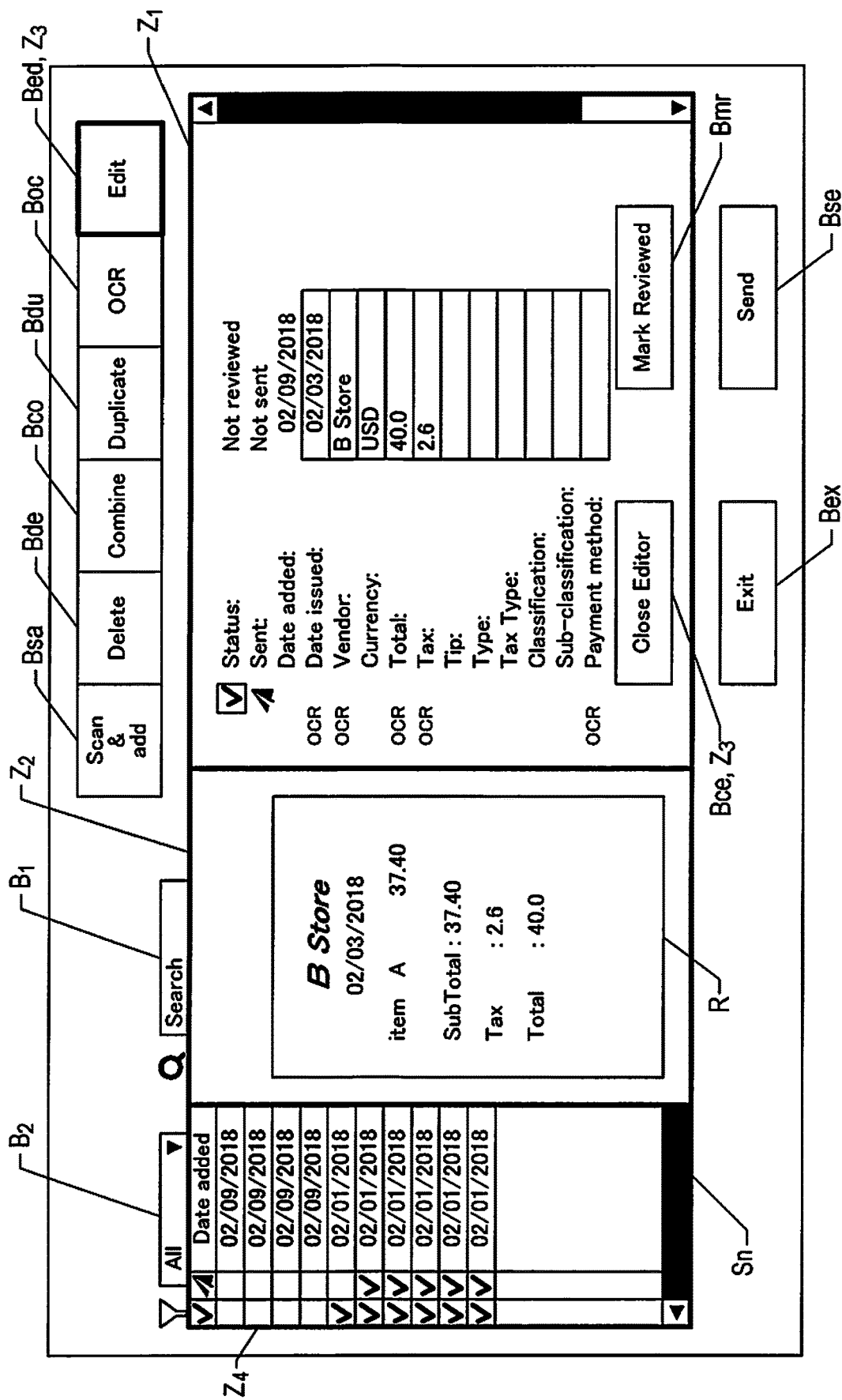
FIG. 10 is view showing an example in which a receipt is switched on the interface screen.

In the present embodiment, the receipt scanned last is added at the topmost portion of the display area of the receipt information in the fourth area $Z_4$. Therefore, the receipt displayed in the first area $Z_1$ and the second area $Z_2$ becomes the receipt information displayed at the topmost portion of the fourth area $Z_4$. As a matter of course, the display target may be switched by an operation of the user, for example by an instruction on the information of any receipt displayed in the fourth area $Z_4$ or the like. FIG. 10 shows an example showing a case of switching to the second receipt from the top of the fourth area $Z_4$ in the example shown in FIG. 9.

Next, the processor 10 specifies the operation of the user by the functioning of the scan result display section 12 (step S135). That is, the processor 10 specifies the operation content by the user on the basis of the signal output from the mouse 3a, the keyboard 3b or the like. When the specified operation content is an edit operation of the OCR data 20b, the processor 10 updates the receipt information by the functioning of the scan result display section 12 (step S140). The edit operation of the OCR data 20b is an operation performed in the first area $Z_1$ (however, an operation on the button Bex for instructing to close the first area $Z_1$ is not included in the edit operation).

Therefore, for example, when the user inputs a letter or a numeral in the box (input box of the total amount or the like) associated with the item label in the first area $Z_1$, the processor 10 specifies that the edit operation of the OCR data 20b is performed in the step S135. Then, the processor 10 updates the input content of the item by the input letter or numeral in the step S140 and records the new OCR data 20b in the HDD 20.

Figure 11:
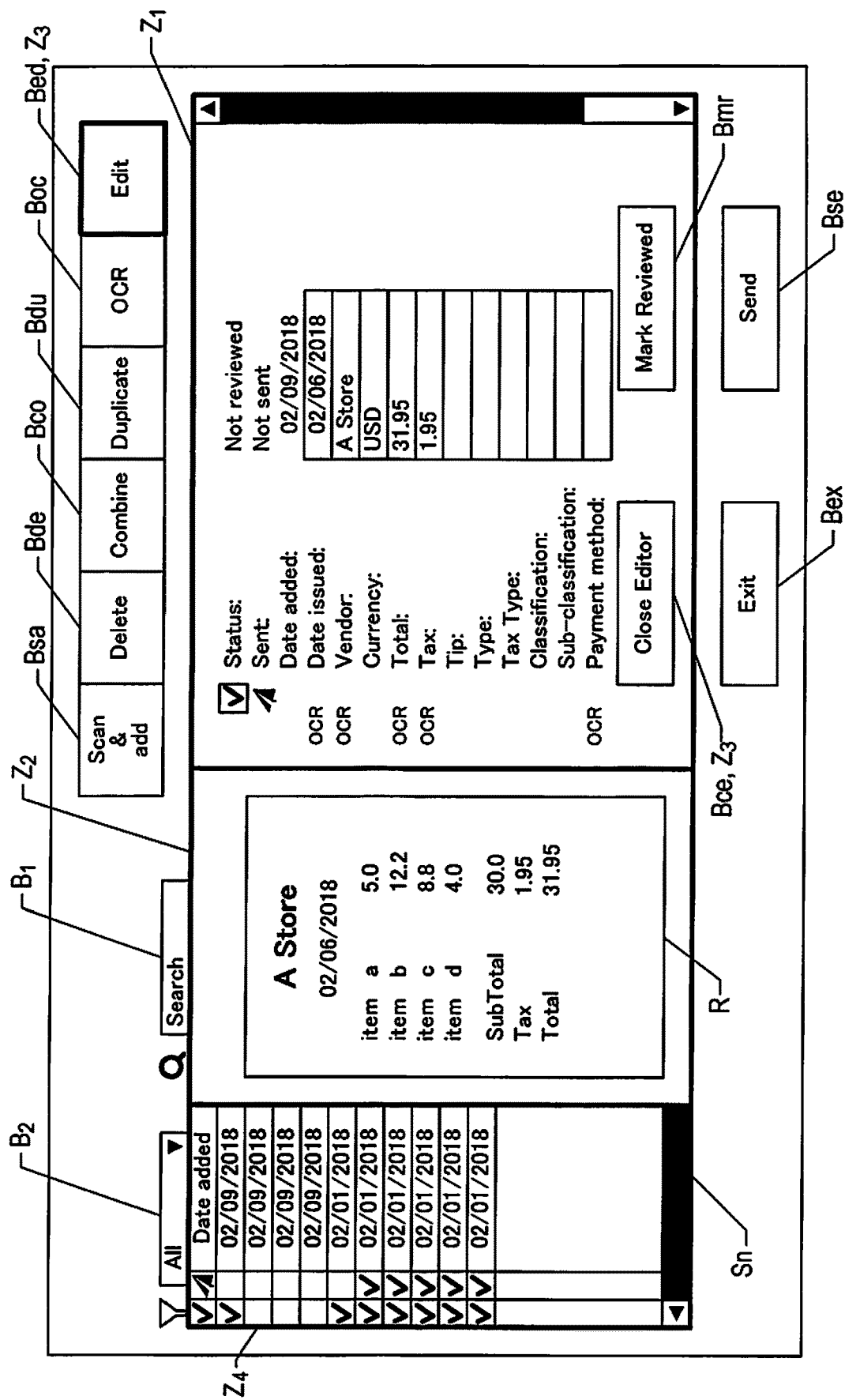
FIG. 11 is a view showing the interface screen when a receipt is reviewed.

Further, when the user instructs a button Bmr in the first area $Z_1$, the processor 10 specifies that the edit operation of the OCR data 20b is performed in the step S135. Then, the processor 10 records the information indicating that the OCR result is reviewed in the HDD 20 in association with the OCR data 20b in the step S140. FIG. 11 shows an interface screen in a case where the button Bmr is instructed in the example shown in FIG. 9. As shown in FIG. 11, a review mark showing that the OCR result of the receipt displayed in the first area $Z_1$ is reviewed is added in the fourth area $Z_4$.

The processor 10 determines whether or not the scan images of the entire receipts are reviewed by the functioning of the scan result display section 12 (step S145). That is, the processor 10 refers to the OCR data 20b and determines that the scan images of the entire receipts are reviewed when the information showing that the OCR result is reviewed is associated with the entire receipt data.

Figure 12:
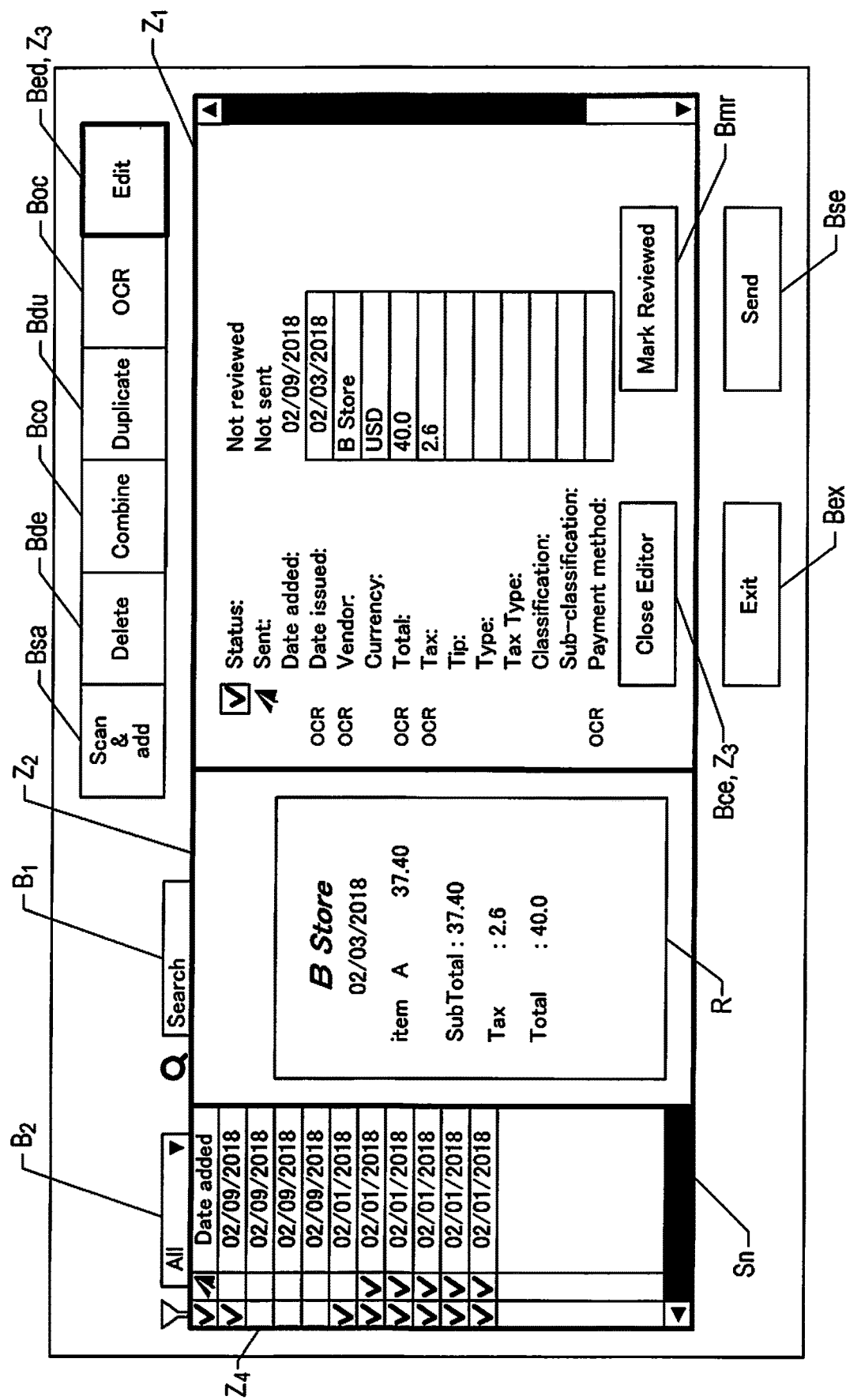
FIG. 12 is a view showing the interface screen on which the next receipt information is displayed after a receipt is reviewed.

When it is not determined that the scan images of the entire receipts are reviewed in the step S145, the processor 10 displays the information of the next receipt in the first area $Z_1$ and the second area $Z_2$ by the functioning of the scan result display section 12 (step S150). That is, the processor 10 refers to the OCR data 20b and, out of the receipts not associated with the information showing that the OCR result is reviewed, selects the receipts having the latest scan date and time as a display target. Then, the processor 10 displays the text indicated by the OCR data 20b of the display target receipt in the first area $Z_1$ on the display 4. Also the processor 10 displays the image indicated by the scan image data 20a of the display target receipt in the second area $Z_2$ on the display 4. Thereafter, the processor 10 repeats the processing from step S135 onward. For example, when the OCR result of the latest receipt is reviewed as in FIG. 11, the information relating to the receipt which is the second from the top is displayed in the first area $Z_1$ and the second area $Z_2$ as shown in FIG. 12.

Figure 13:
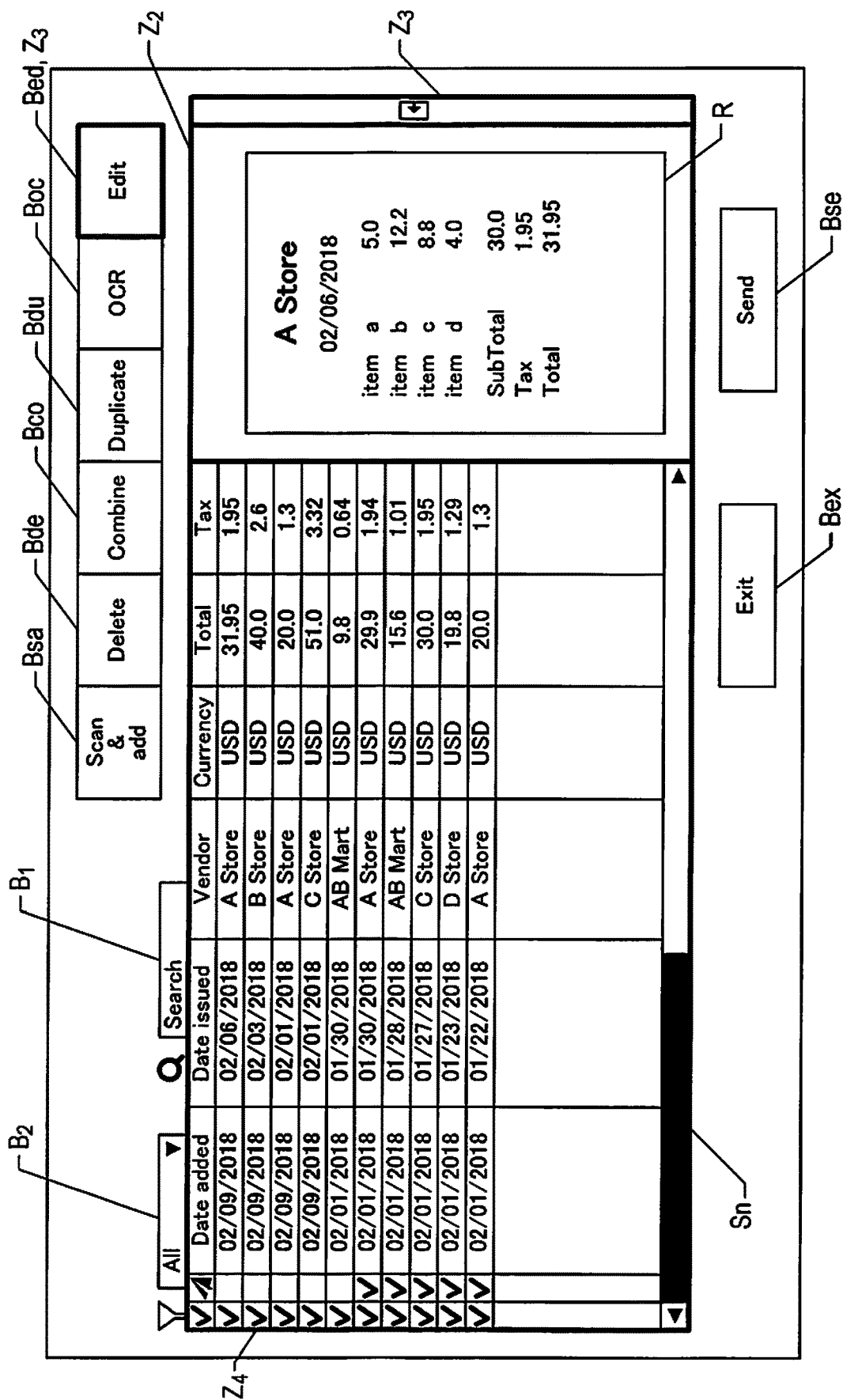
FIG. 13 is a view showing an example of the interface screen displayed when it is determined that the scan images of the entire receipts are reviewed.

On the other hand, when it is determined that the scan images of the entire receipts are reviewed in the step S145, or when it is specified that the operation on the third area $Z_3$ is performed in step S135, the processor 10 does not display the first area $Z_1$ by the functioning of the scan result display section 12 (step S155). That is, the processor 10 moves the second area $Z_2$ to the right side and displays the fourth area $Z_4$ in the empty space. At this time, the processor 10 generates image data of the animation in which the first area $Z_1$ disposed on the right side of the second area $Z_2$ shrinks to the right side, and changes the screen on the right side of the display 4 on the basis of the image data. When the first area $Z_1$ is not displayed, the processor 10 displays the third area $Z_3$ on the right side of the second area $Z_2$. FIG. 13 is a view showing an example of the interface screen displayed when it is determined that the scan images of the entire receipts are reviewed.

If it is determined that the user performs an operation other than the edit operation in the step S135, the processor 10 skips the steps S140 to S150 and executes the step S155. Here, the other operation is an operation other than the editing of the OCR data 20b. Therefore, the other operation is an operation on a button provided in an area other than the first area $Z_1$ or the button Bce for instructing to close the first area $Z_1$.

For example, if an operation (operation on the button Bed labelled "Edit" or the button Bce in the first area $Z_1$) on the third area $Z_3$ is performed, the processor 10 specifies that the other operation is performed. In this case, the processor 10 skips the steps S140 and S145. Also, if the user operates on the buttons Bsa, Bde, Bco, Bdu, Boc, Bse, and Sex or selects the receipts displayed in the fourth area $Z_4$, the processor 10 determines that the other operation is performed.

Figure 14:
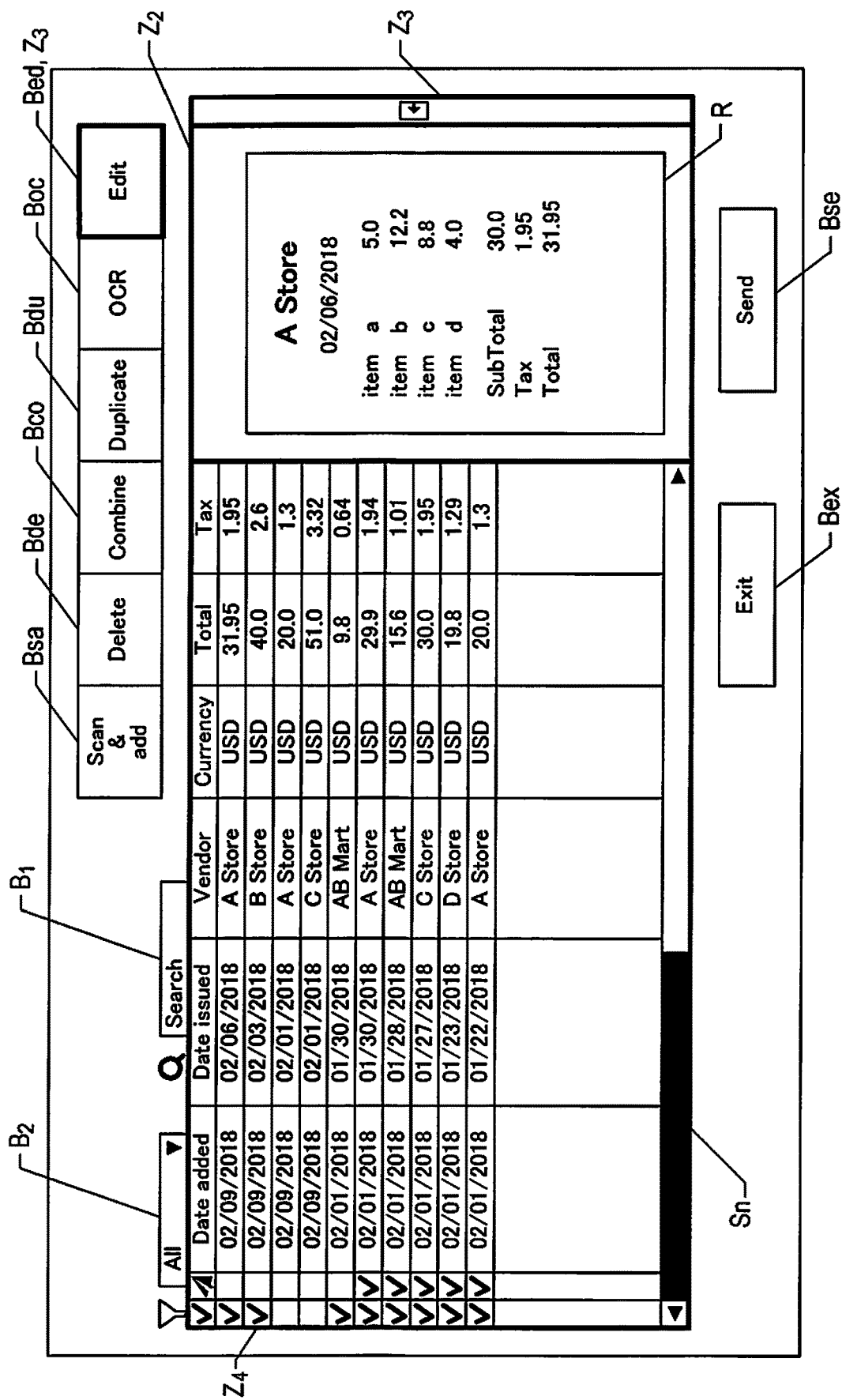
FIG. 14 is a view showing an example of the interface screen displayed when another operation is performed before the scan images of the entire receipts are reviewed.

In any case, if it is determined that the other operation is performed in the step S135, the processor 10 executes the step S155. Therefore, in the present embodiment, an operation of the user on the third area $Z_3$ is received, and the first area $Z_1$ is hidden. As a result, the size of the fourth area $Z_4$ expands, and the user can list information relating to more receipts. FIG. 14 is a view showing an example of the interface screen displayed when the other operation is performed before the scan images of the entire receipts are reviewed.

Since the operation other than the operation on the third area $Z_3$ is included in the other operation in the present embodiment, when an operation different from the edit operation is performed, even if the operation is an operation other than the operation on the third area $Z_3$, the first area $Z_1$ is not displayed. An operation on the button Bsa is included in the other operation, and the scan of the receipt can be started by the operation on the button Bsa. Therefore, in the present embodiment, in accordance with an instruction to start the scan of the receipt, a configuration in which the first area is not displayed can be adopted. Therefore, the size of the fourth area $Z_4$ expands after the scan of the receipt starts until the scan is completed, and the user can list information relating to more receipts.

When the step S155 is executed, or when it is not determined that the scan result display program is activated together with the scan of the receipt in the step S105, the processor 10 executes processing in accordance with the operation the user executes on the basis of the mouse 3a or the keyboard 3b or the like in the step S160 onward.

If the user performs an operation on the button Bsa, the processor 10 determines that the scan instruction is performed in the step S160. In this case, the processor 10 executes the scan by the functioning of the scanner control section 11 (step S165). That is, the processor 10 controls the scanner 2 to scan the receipt. As a result, the scanner 2 outputs the scan image data 20a, and the processor 10 associates the scan image data 20a with the receipt identification information and records the data in the HDD 20. Thereafter, the processor 10 executes the processing from the step S110 onward.

When the user performs the selection of the receipt displayed in the fourth area $Z_4$, the processor 10 determines in the step S170 that the selection of the receipt is performed. In this case, the processor 10 receives the selected receipt by the functioning of the scan result display section 12 (step S175). That is, the interface screen shown in FIG. 13 is displayed on the display 4, and in this state, the user can operate the mouse 3a or the like and select one or more receipts displayed in the fourth area $Z_4$. When the receipt is selected, the processor 10 receives the selection of the receipt by specifying the identification information of the selected receipt.

When the user performs an operation on the button Bse, the processor 10 determines that report execution instruction is performed in the step S180. In this case, the processor 10 determines whether or not the entire selected receipts are reviewed by the functioning of the scan result display section 12 (step S185). That is, the processor 10 acquires the OCR data 20b of the receipt of which the selection is received in the step S175 and determines that the entire selected receipts are reviewed when the information showing that the OCR result is reviewed is associated with entire OCR data 20b acquired.

When it is determined in the step S185 that the entire selected receipts are reviewed, the processor 10 reports the selected receipts (step S200). That is, the processor 10 transmits the scan image data 20a and the OCR data 20b of the selected receipt to the outside server 5 through the network interface 50. On the other hand, when it is not determined that the entire selected receipts are reviewed in the step S185, the processor 10 determined whether or not an unreviewed transmission is permitted (step S190), and executes the step S200 when the unreviewed transmission is permitted. When it is not determined that the unreviewed transmission is permitted in the step S190, the processor 10 skips the step S200.

Figure 15:
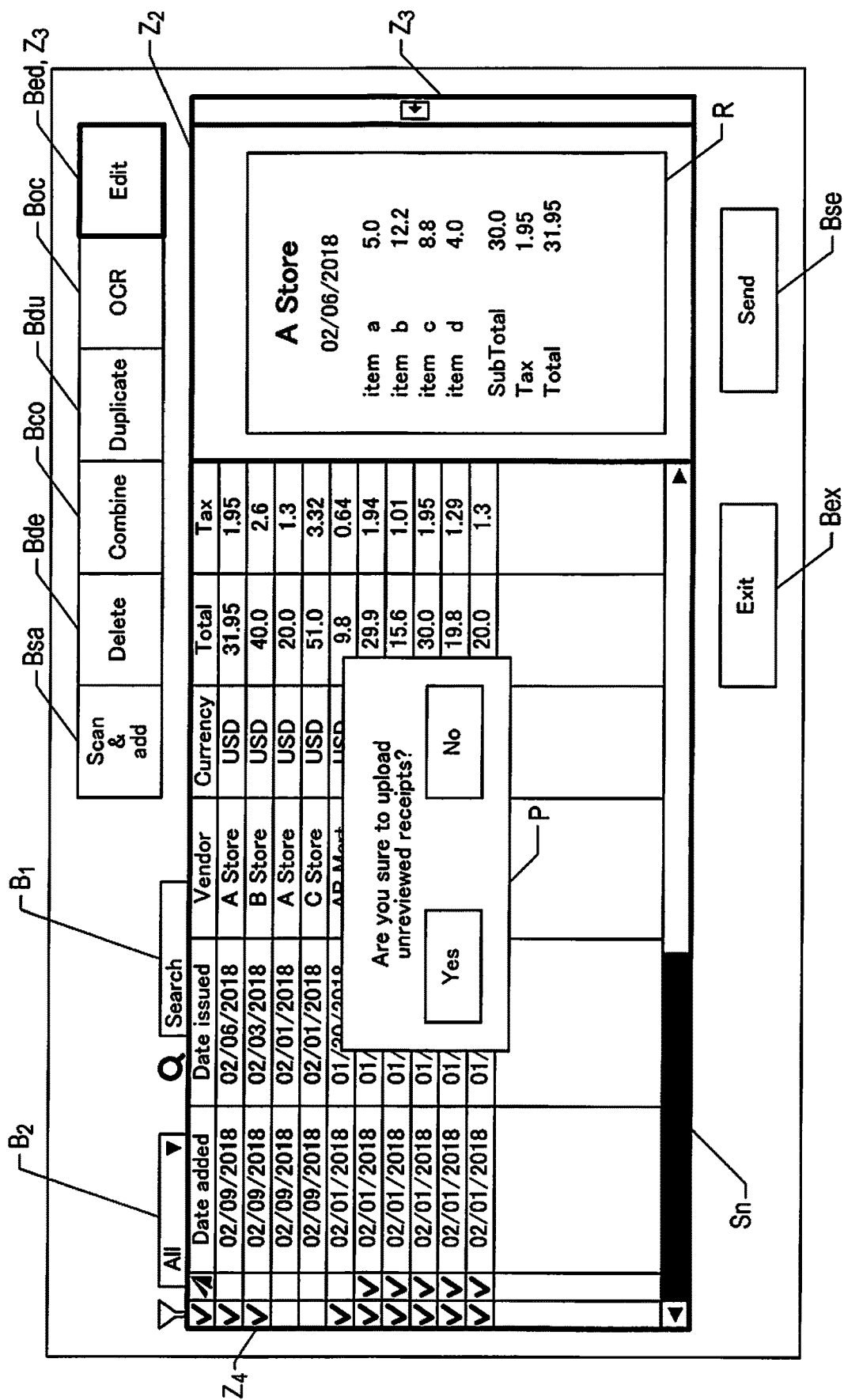
FIG. 15 is a view showing an example of a pop-up screen inquiring whether or not to perform reporting including an unreviewed receipt.

A variety of modes can be considered as a mode for permitting the unreviewed transmission. For example, at the time the determination of the step S190 is performed, it is possible to adopt a configuration in which the processor 10 can display a pop-up screen on the interface screen and receives the input as to whether or not the unreviewed transmission is permitted on the pop-up screen. The pop-up screen may be a variety of screens. For example, as shown in FIG. 15, the configuration may be such that the pop-up screen P is displayed on the screen shown in FIG. 14 and whether or not a report including the unreviewed receipt is performed is inquired. As a matter of course, a configuration in which the user inputs in advance whether or not an unreviewed transmission is allowed may be adopted.

Figure 16:
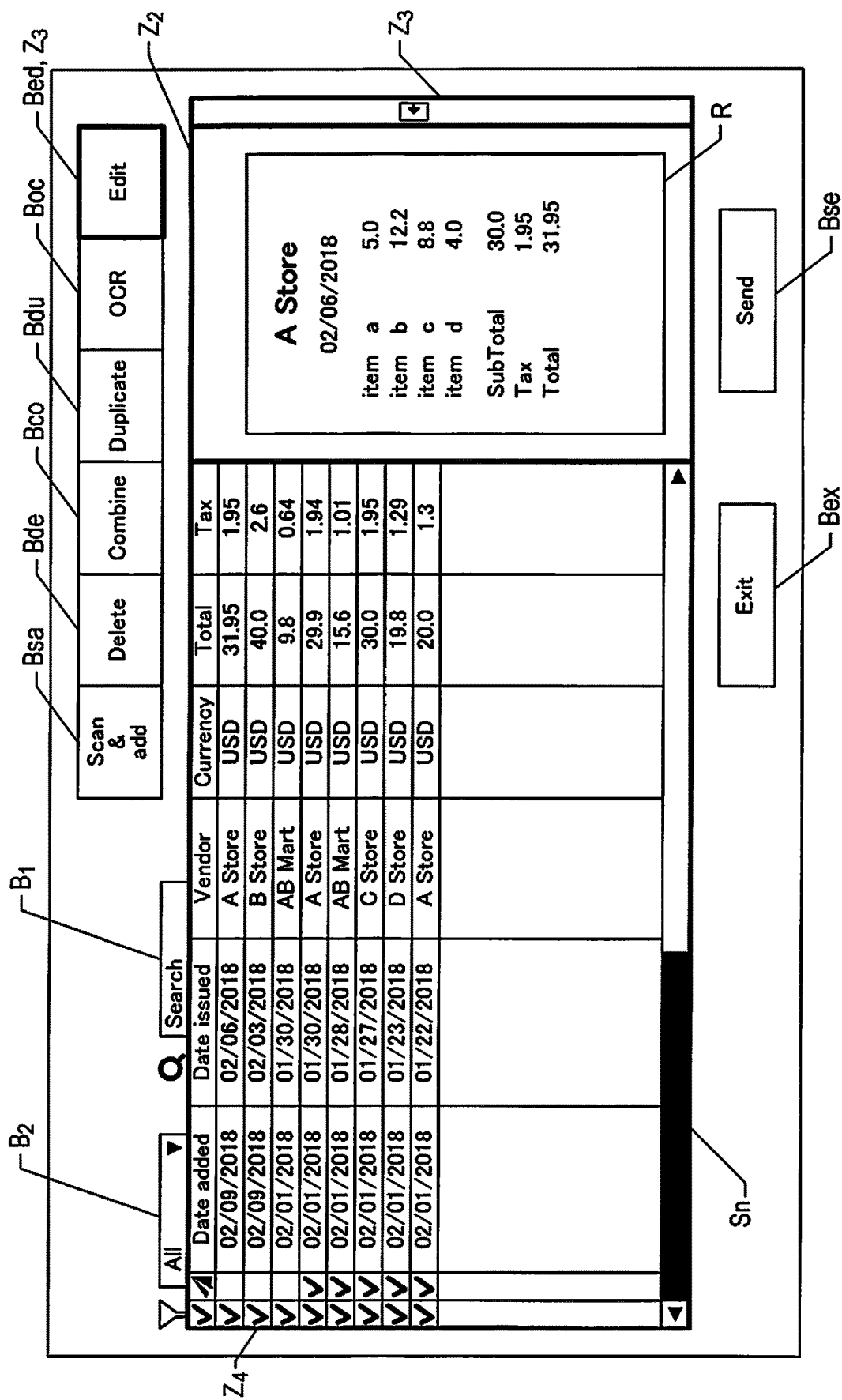
FIG. 16 is a view showing an example of the interface screen when a receipt is deleted.

When the user performs an operation on the button Bde, the processor 10 determines that the delete execution instruction is performed in the step S210. In this case, the processor 10 deletes the OCR data 20b and the scan image data 20a of the selected receipt from the HDD 20 (step S215) by the functioning of the scan result display section 12. As a matter of course, if the OCR data 20b and the scan image data 20a of these receipts are transmitted to the outside server 5, the data recorded in the outside server 5 may be deleted. FIG. 16 is a view showing an example of the interface screen after the unreviewed receipts shown in FIG. 14 are deleted.

When the user performs an operation on the button Bco, the processor 10 determines that a combine execution instruction is performed in the step S220. In this case, the processor 10 combines the OCR data 20b and the scan image data 20a of the selected receipt by the functioning of the scan result display section 12 (step S225). In this case, the processor 10 associates one receipt identification number with the combined OCR data 20b and the scan image data 20a. As a matter of course, if the OCR data 20b and the scan image data 20a before these combinations are transmitted to the outside server 5, the outside server 5 may be controlled to store the combined data.

Figure 17:
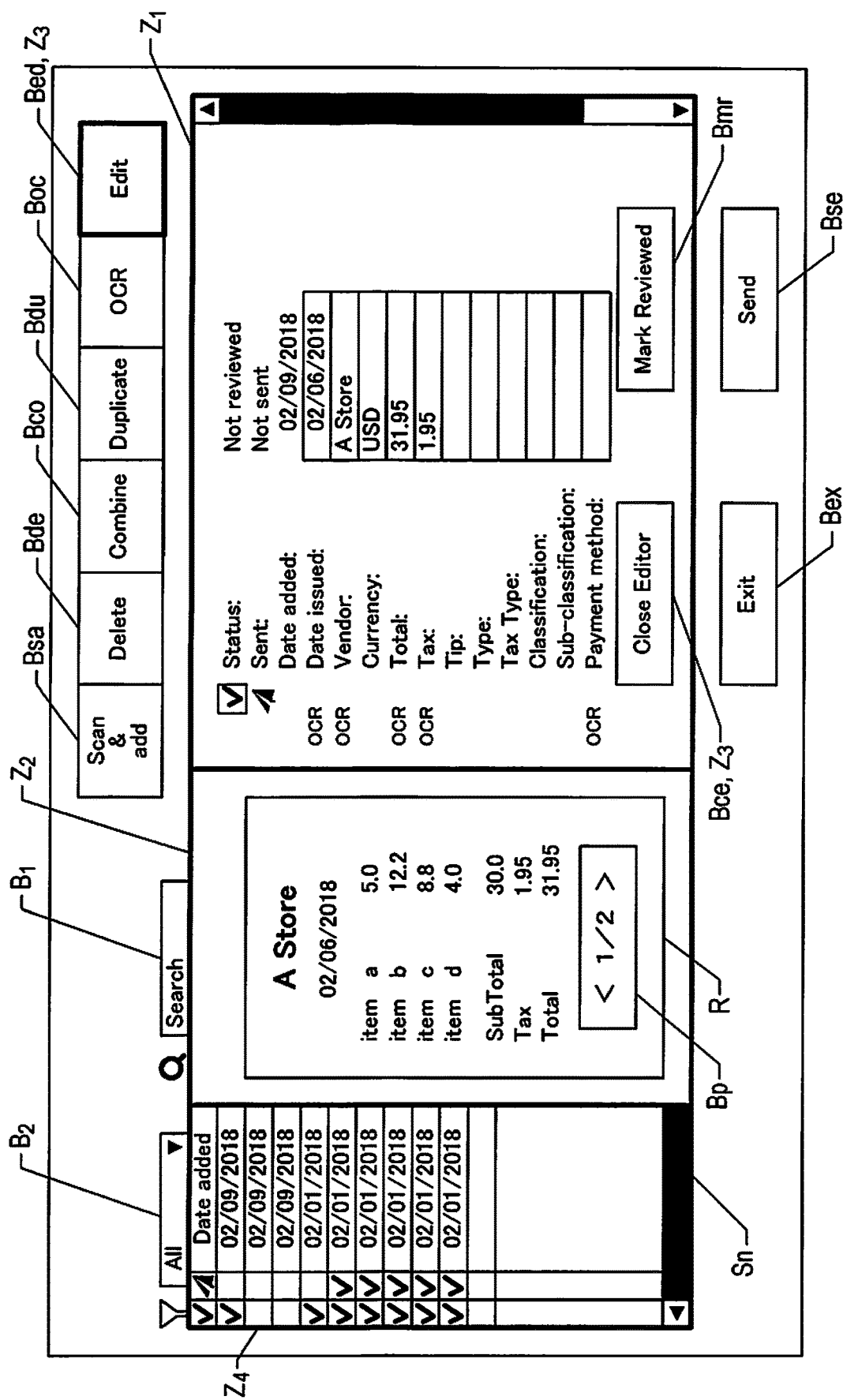
FIG. 17 is a view showing an example of the interface screen when receipts are combined.

FIG. 17 shows an example of the interface screen displayed when the receipts displayed at the top and the second from the top in the example shown in FIG. 14 are combined. In this example, the processor 10 displays the combined receipt information in the first area $Z_1$ and the second area $Z_2$ by the functioning of the scan result display section 12. That is, the processor 10 moves the second area $Z_2$ to the left side and displays the first area $Z_1$ in the empty space. Then, the processor 10 displays the combined receipt information in the first area $Z_1$ and the second area $Z_2$ formed on the screen.

The box Bp for specifying a page is provided in the second area $Z_2$ on the interface screen shown in FIG. 17. When the user operates the mouse 3a or the like and performs an instruction to ">" mark in the box, the processor 10 selects, out of the images of receipts that are combined into a plurality of pages, a page one page after the page on display as a display target and displays the page. When the user operates the mouse 3a or the like and performs an instruction to "<" mark in the box, a page one page before the page on display is selected as a display target out of the images of receipts that are combined into a plurality of pages and displayed.

When the user performs an operation on the button Bdu, the processor 10 determines that the duplicate execution instruction is performed in the step S230. In this case, the processor 10 duplicates the OCR data 20b and the scan image data 20a of the selected receipt by the functioning of the scan result display section 12 (step S235). In this case, the processor 10 copies the OCR data 20b and the scan image data 20a of the selected receipt and stores the data in the HDD 20. Then, the copied data is associated with an identification number different from the identification number of the original receipt. As a matter of course, even the outside server 5 may be controlled so that the duplicated data is stored. If no receipt is selected, the determination in steps S180, S210, S220, and S230 may be skipped.

Figure 18:
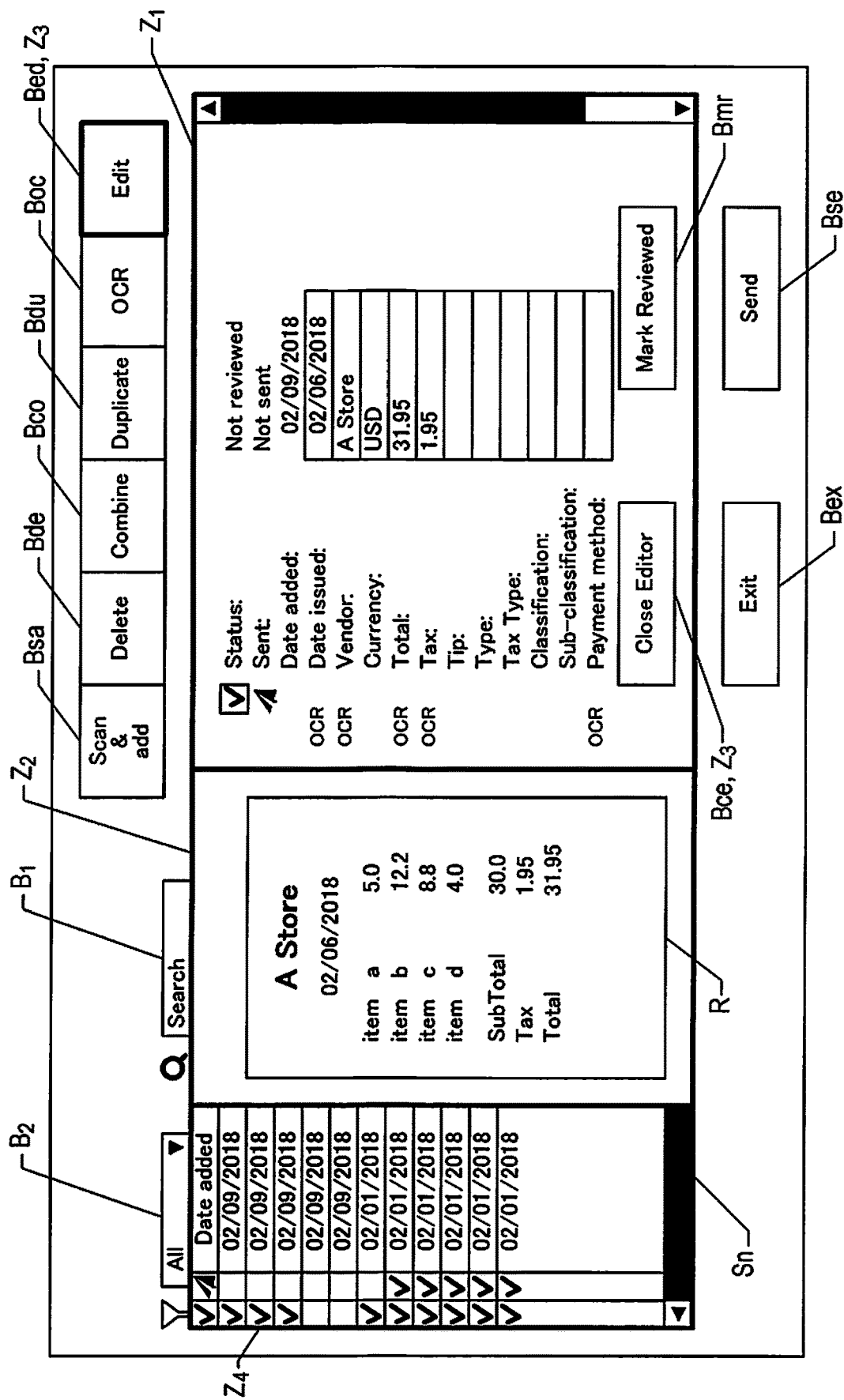
FIG. 18 is a view showing an example of the interface screen when a receipt is duplicated.

FIG. 18 shows an example of the interface screen displayed when the receipt at the top in the example shown in FIG. 14 is duplicated. In this example, the processor 10 displays the information of the duplicated receipt in the first area $Z_1$ and the second area $Z_2$ by the functioning of the scan result display section 12. That is, the processor 10 moves the second area $Z_2$ to the left side and displays the first area $Z_1$ in the empty space. Then, the processor 10 displays the information of the duplicated receipt in the first area $Z_1$ and the second area $Z_2$ formed on the screen.

In a state where the first area $Z_1$ is displayed, the user can edit the OCR data 20b. Then, if the user inputs information that can identify each of the duplicated receipts, for example, in the "Classification" item, each of the duplicated receipts can be differentiated and used.

When the user performs an operation on the button Boc, the processor 10 determined that the OCR processing execution instruction is performed in the step S240. In this case, the processor 10 executes processing from the step S110 onward. However, in this case, the target of the OCR processing is the receipt selected by the user.

That is, in the present embodiment, the image data can be taken as the scan image data 20a of the receipt by the button Bsa. In this case, the receipt on which the OCR processing is not performed is displayed in the fourth area $Z_4$. When the step S110 is executed through the determination in the step S240 in a state where such a receipt is selected, the scan image 20a of the selected receipt becomes the target of the OCR processing.

If the OCR processing is performed, the OCR processing result is added to the fourth area $Z_4$ in the step S115. Also, when a plurality of receipts are selected and the OCR processing on the entire selected receipts is not completed, it is determined in the step S120 that the OCR processing is not completed, and the step S110 is repeated.

On the other hand, when the operation is performed on the button Bed or the third area $Z_3$ provided on the right side of the second area $Z_2$ shown in FIG. 2 or, processor 10 determined that the edit execution instruction is performed in the step S250. In this case, the processor 10 repeats the processing from the step S125 onward. That is, in the present embodiment, the operation of the user to the third area $Z_3$ is received and the first area $Z_1$ which has not been displayed is displayed on the display. The receipt displayed in the first area $Z_1$ and the second area $Z_2$ in the step S130 is either a receipt selected by the user or a receipt displayed at the topmost portion of the fourth area 24. According to this configuration, the user can execute editing relating to any receipt at the desired time.

When the user performs an operation on the button Bex, the processor 10 determined that an exit execution instruction is performed in the step S260. In this case, the processor 10 terminates the scan result display processing.

3. Other Embodiment

The above embodiment is an example of implementing the invention, and a variety of other embodiments can be adopted. For example, a scan apparatus in accordance with an embodiment of the invention may be applied to a multifunctional device or the like which is an electronic device used for purposes other than reading. Further, as in the above embodiment, the method of displaying the scan image and the OCR processing result upon the completion of the scan can be realized as an invention of the program and an invention of the method.

Further, the number of devices constituting the scan apparatus may be any number. For example, the computer 1 and the scanner 2 may be realized in an integrated device, and a variety of other devices, the display 4 for example, may be integrated. Also, the scanner 2 may be controlled by a tablet terminal in which the computer 1 and the display 4 are integrated. Further, the embodiment described above is an example, and an embodiment in which a part of the configuration is omitted or another configuration is added can be adopted.

The scan apparatus may be able to read the amount information from the scanned receipt by OCR processing and report the information. That is, in the scan apparatus, at least the amount information which is the most important information in the receipt may be read and the OCR processing may be performed so that the information can be used as text data or the like. As a matter of course, the reading target is not limited to the amount information, but may be a variety of information described in the receipt.

The OCR processing may be able to read at least the amount information from the features of the image of the scanned receipt. Therefore, the OCR processing may be able to read numerals but may also be configured to read numerals like the receipt issuing date and the character strings in various languages, and the information other than numerals and characters, such as a specified correspondence between character strings and numerals may be read.

The processor may be a device capable of executing a variety of processing, may be composed of a single chip, or may be composed of a plurality of chips. Also, the processor is not limited to a configuration provided with a CPU, a RAM, or the like as in the embodiment described above. For example, an ASIC may be used instead of the CPU, or the CPU and the ASIC may cooperate with each other.

Also, triggered by the completion of the scan, the processor switches display contents on the display, but at least may be able to control the display content on the display and may be configured to control the display in a variety of areas other than the first area, the second area and the third area.

The receipt may be a medium on which at least the amount information is written but may also be a variety of media handed between the participants in a commercial transaction for the purpose of certifying the amount. Therefore, a sales slip is included in the receipt. Also, a bankbook or other medium showing the amount of money deposited at and withdrawn from a bank can be called a receipt, and a bill or the like may also be called a receipt. Also, the amount information may be described in any form such as numerals, words, barcodes, and the like.

The completion of the scan means that the reading of at least one receipt is completed and the reading result of at least one or more receipts is ready to be displayed in the first area or the second area. Therefore, both the first area and the second area may be displayed after reading of at least one receipt is completed. When a plurality of receipts are scanned in a row, the first area and the second area may be displayed after the scan of the plurality of receipts is completed as in the embodiment described above, and the first area and the second area may be displayed after the scan of a predetermined number of receipts is completed.

Also, the completion of the scan may be a trigger for displaying both the first area and the second area at the same time, and the area displayed before the completion of the scan may be either the first area or the second area. If the second area is configured to be displayed upon the completion of the scan when the first area is displayed on the initial screen, the OCR processing result can be visually reviewed normally, and the image of the scanned receipt is configured to be reviewed in the second area at the time of review.

The first area may be an area of which the contents read by the performance of the OCR processing on the receipt is displayed on the display, and the display mode, the size, the shape, and the display position of the read content and the size, the shape, the display position and the like of the first area may be of various configurations. The second area may be an area in which the image of the scanned receipt is displayed, and the display mode and the size, the shape, and the display position of the image and the size, the shape, the display position, and the like of the second area may be of various configurations.

A variety of modes are possible for displaying and hiding the first area and the second area, and animation may not be used when the two areas are switched. Also, the animation may also assume a variety of modes. Also, as for the hiding, the entire or a part of the display content in the area may be hidden, or a part of the area (for example, a part of the window constituting the area) may remain displayed.

The third area should be an area for receiving a switching operation of the area display, may be configured with a variety of icons showing a variety of display switch, and may be an area that includes characters showing the display switch. The character may always be the same character or may change like "Edit" when the area is hidden and "Close" when the area is displayed. Also, when the first area and the second area are hidden, if a part of the area remains on display and an operation is performed on the part, and if the hidden area is displayed, the part can also become the third area. For example, the animation is performed such that the vertical bar which is the thirds area $Z_3$ with a leftward-pointing arrow written therein in FIG. 2 moves to the left side when the first area $Z_1$ is display and turns into a vertical bar between the first area $Z_1$ and the second area $Z_2$ with a rightward-pointing arrow therein, and the vertical bar can become the third area $Z_3$. It is desirable that the third area $Z_3$ is displayed at the same position regardless of whether the area such as Bed is displayed or hidden or moves by the animation in accordance with the switch between the display and the hiding. As a result, even if the user hides the area for the moment, the user can easily understand where to operate to display the area.

The operation of the user may be executed in a variety of modes, may be an instruction operation by the input section such as a mouse or the like as described above, may be even a touch operation to the third area using a touch panel. That is, a variety of operations are considered. When the operation on the third area is the touch operation, the operation may be a variety of operations such as tapping and swiping.

The fourth area may be an area in which a list of receipts is displayed. Therefore, a plurality of scanned receipts may be displayed in a row in the fourth area such that the receipts can be visually reviewed at the same time. The display form, the size, the shape and the display position of the information relating to each receipt, and the size, the shape, the display position and the like of the fourth area may be of various configurations.

Further, the invention can be applied as a program or a method executed by a computer. Also, the program and the method as described above may be realized as a single device in some cases or as a system using components provided in a plurality of devices, and include a variety of aspects. Also, it is possible to alter as deemed appropriate such that, for example, a part is a software and a part is a hardware. Further, the invention is also established as a recording medium of the program. The recording medium of the program may be a magnetic recording medium or a magneto-optical recording medium, or any recording medium to be developed in the future can be all considered in the same manner. Also, each component may be a module component, which is a combination of a plurality of component, or a single component may serve as the plurality of components described above. Also, the invention may be applied to the case where the scan target is a document other than the receipt and the information described in the document is read and reported.

The entire disclosure of Japanese Patent Application No. 2018-046359, filed Mar. 14, 2018 is incorporated by reference herein.

What is claimed is:

1. A scan system that reads amount information by an OCR processing from a scanned receipt and performs reporting, comprising:
   a processor that displays a first area in which a content read by a performance of the OCR processing on the receipt is displayed and a second area in which an image of the scanned receipt is displayed on a display when a scan of the receipt is completed, with the first area being different from the second area such that the content read by the performance of the OCR processing on the receipt is displayed at a location spaced apart from the image of the scanned receipt,
   the processor hiding at least one of the first area and the second area displayed on the display upon receiving an operation of a user on a third area displayed on the display, and displaying at least one of the hidden first area and second area on the display upon receiving an operation of the user on the third area, and
   in response to the scan of the receipt being completed while at least one of the first area and the second area is being hidden, the processor automatically without a user interaction displaying the at least one of the first area and the second area that is being hidden on the display.

2. The scan system according to claim 1, wherein the processor displays the first area, the second area, the third area and a fourth area in which a list of the receipts is displayed on the display when the scan of the receipt is completed.

3. The scan system according to claim 1, wherein the processor, in accordance with the start instruction of the scan of the receipt, automatically hides at least one of the first area and the second area.

4. A non-transitory storage medium that stores a scan result display program that causes a scan system which reads information by an OCR processing from a scanned document and performs reporting to function as a scan result display section which
   displays a first area in which a content read by a performance of the OCR processing on the document is displayed and a second area in which an image of the scanned document is displayed on the display when a scan of the document is completed, with the first area being different from the second area such that the content read by the performance of the OCR processing on the document is displayed at a location spaced apart from the image of the scanned document,
   hides at least one of the first area and the second area displayed on the display upon receiving an operation of a user on a third area displayed on the display, and displays at least one of the hidden first area and the second area on the display upon receiving an operation of the user on the third area, and
   in response to the scan of the document being completed while at least one of the first area and the second area is being hidden, automatically without a user interaction displays the at least one of the first area and the second area that is being hidden on the display.

* * * * *